(12) United States Patent
Zhang et al.

(10) Patent No.: US 12,309,793 B2
(45) Date of Patent: May 20, 2025

(54) UNSYNCHRONIZED MULTI-TRANSMISSION RECEPTION POINT SCHEDULING OPERATION

(71) Applicant: Apple Inc., Cupertino, CA (US)

(72) Inventors: Yushu Zhang, Beijing (CN); Wei Zeng, Saratoga, CA (US); Dawei Zhang, Saratoga, CA (US); Haitong Sun, Cupertino, CA (US); Hong He, San Jose, CA (US); Huaning Niu, San Jose, CA (US); Chunxuan Ye, San Diego, CA (US); Sigen Ye, Whitehouse Station, NJ (US); Oghenekome Oteri, San Diego, CA (US)

(73) Assignee: Apple Inc., Cupertino, CA (US)

( * ) Notice: Subject to any disclaimer, the term of this patent is extended or adjusted under 35 U.S.C. 154(b) by 634 days.

(21) Appl. No.: 17/439,378

(22) PCT Filed: Oct. 20, 2020

(86) PCT No.: PCT/CN2020/122274
§ 371 (c)(1),
(2) Date: Sep. 14, 2021

(87) PCT Pub. No.: WO2022/082455
PCT Pub. Date: Apr. 28, 2022

(65) Prior Publication Data
US 2022/0304036 A1   Sep. 22, 2022

(51) Int. Cl.
*H04W 72/23*   (2023.01)
*H04L 5/00*    (2006.01)
*H04W 36/00*   (2009.01)
*H04W 56/00*   (2009.01)

(52) U.S. Cl.
CPC ........... *H04W 72/23* (2023.01); *H04L 5/0035* (2013.01); *H04L 5/0048* (2013.01); *H04W 56/001* (2013.01); *H04W 36/00692* (2023.05)

(58) Field of Classification Search
None
See application file for complete search history.

(56) References Cited

U.S. PATENT DOCUMENTS

| | | | |
|---|---|---|---|
| 11,172,417 B2 * | 11/2021 | Park | H04W 36/0072 |
| 2014/0003262 A1 | 1/2014 | He et al. | |
| 2019/0215048 A1 | 7/2019 | Cirik et al. | |

(Continued)

FOREIGN PATENT DOCUMENTS

| | | |
|---|---|---|
| CN | 104798321 A | 7/2015 |
| CN | 111435863 | 7/2020 |
| EP | 3253154 | 12/2017 |

OTHER PUBLICATIONS

Motorola, Blind Decoding and Search Spaces for Carrier Aggregation, 3GPP TSG RAN WG1 Meeting #61, R1-103168, May 10-14, 2010, 14 pages.

(Continued)

*Primary Examiner* — Hong S Cho
(74) *Attorney, Agent, or Firm* — Kilpatrick Townsend & Stockton LLP

(57) ABSTRACT

The present application relates to devices and components including apparatus, systems, and methods to provide unsynchronized multi-transmission reception point operation in wireless communication systems.

20 Claims, 22 Drawing Sheets

(56) References Cited

U.S. PATENT DOCUMENTS

| | | | |
|---|---|---|---|
| 2019/0222286 A1 | 7/2019 | Miao | |
| 2019/0313390 A1 | 10/2019 | Cheng | |
| 2021/0307049 A1* | 9/2021 | Venugopal | H04L 5/0094 |
| 2022/0014346 A1* | 1/2022 | Zhang | H04B 7/022 |
| 2022/0216904 A1* | 7/2022 | Zhu | H04W 24/08 |
| 2022/0322115 A1* | 10/2022 | Zhou | H04W 24/10 |
| 2023/0198594 A1* | 6/2023 | Kim | H04L 5/0057 370/252 |
| 2023/0216565 A1* | 7/2023 | Kwak | H04B 7/0695 375/267 |

OTHER PUBLICATIONS

International Patent Application No. PCT/CN2020/122274, International Search Report and Written Opinion, Mailed on Jul. 29, 2021, 9 pages.

3rd Generation Partnership Project; Technical Specification Group Radio Access Network; NR; Physical layer procedures for control (Release 16), 3GPP TS 38.213 V16.3.0, Sep. 2020, 179 pages.

3rd Generation Partnership Project; Technical Specification Group Radio Access Network; NR; Physical layer procedures for data (Release 16), 3GPP TS 38.214 V16.3.0, Sep. 2020, 166 pages.

3rd Generation Partnership Project; Technical Specification Group Radio Access Network; NR; Medium Access Control (MAC) protocol specification (Release 16), 3GPP TS 38.321 V16.2.1, Sep. 2020, 154 pages.

3rd Generation Partnership Project; Technical Specification Group Radio Access Network; NR; Radio Resource Control (RRC) protocol specification (Release 16), 3GPP TS 38.331 V16.2.0, Sep. 2020, 921 pages.

3rd Generation Partnership Project; Technical Specification Group Radio Access Network; Study on New Radio Access Technology Physical Layer Aspects (Release 14), 3GPP TR 38.802 V14.2.0, Sep. 2017, 145 pages.

The International Application No. PCT/CN2020/122274, "International Preliminary Report on Patentability", mailed May 4, 2023, 6 pages.

Emimo Corrections, 3 Generation Partnership Project Technical Specification Group-Radio Access Network Working Group2 Meeting #109bis-e, R2-2003899, Apr. 20-Apr. 30, 2024, pp. 1-332.

China Patent Application No. 202080106367.5, Office Action, Nov. 18, 2024, 10 pages.

* cited by examiner

```
PUSCH-Config ::=       SEQUENCE {
    dataScramblingIdentityPUSCH      INTEGER (0..1023)                                OPTIONAL,  -- Need S
    dataScramblingIdentityPUSCH2     INTEGER (0..1023)                                OPTIONAL,  -- Need R
    <unrelated part omitted> pusch-PowerControl               PUSCH-PowerControl                               OPTIONAL,  -- Need M
    <unrelated part omitted> pusch-PowerControl-v16xy         PUSCH-PowerControl-v16xy
    ul-FullPowerTransmission-r16     ENUMERATED {fullpower, fullpowerMode1, fullpowerMode2}  OPTIONAL,  -- Need S
                                                                                      OPTIONAL,  -- Need R
    }}

PUSCH-PowerControl ::=    SEQUENCE {
    <unrelated part omitted>
    pathlossReferenceRSToAddModList     SEQUENCE (SIZE (1..maxNrofPUSCH-PathlossReferenceRSs)) OF PUSCH-PathlossReferenceRS-Id
                                                                                      OPTIONAL,  -- Need N
    pathlossReferenceRSToReleaseList    SEQUENCE (SIZE (1..maxNrofPUSCH-PathlossReferenceRSs)) OF PUSCH-PathlossReferenceRS-Id
                                                                                      OPTIONAL,  -- Need N
    pathlossReferenceRSToAddModList2    SEQUENCE (SIZE (1..maxNrofPUSCH-PathlossReferenceRSs)) OF PUSCH-PathlossReferenceRS-Id
                                                                                      OPTIONAL,  -- Need N
    pathlossReferenceRSToReleaseList2   SEQUENCE (SIZE (1..maxNrofPUSCH-PathlossReferenceRSs)) OF PUSCH-PathlossReferenceRS-Id
                                                                                      OPTIONAL,  -- Need N
    <unrelated part omitted>
    }
```

Figure 4

```
PUCCH-ConfigCommon ::=     SEQUENCE {
    pucch-ResourceCommon       INTEGER (0..15)                                           OPTIONAL,  -- Cond InitialBWP-Only
    pucch-GroupHopping         ENUMERATED { neither, enable, disable },
    hoppingId                  INTEGER (0..1023)                                         OPTIONAL,  -- Need R
    hoppingId2                 INTEGER (0..1023)                                         OPTIONAL,  -- Need R
    p0-nominal                 INTEGER (-202..24)                                        OPTIONAL,  -- Need R
    ...
}

PUCCH-PowerControl ::=     SEQUENCE {
    <unrelated part omitted>
    pathlossReferenceRSs       SEQUENCE (SIZE (1..maxNrofPUCCH-PathlossReferenceRSs)) OF PUCCH-PathlossReferenceRS  OPTIONAL,  -- Need M
    pathlossReferenceRSs       SEQUENCE (SIZE (1..maxNrofPUCCH-PathlossReferenceRSs)) OF PUCCH-PathlossReferenceRS  OPTIONAL,  -- Need M
    twoPUCCH-PC-AdjustmentStates  ENUMERATED {twoStates}                                OPTIONAL,  -- Need S
    ...
}

SRS-ResourceSet ::=        SEQUENCE {
    srs-ResourceSetId          SRS-ResourceSetId,
    <unrelated part omitted>
    pathlossReferenceRS        PathlossReferenceRS-Config
    srs-PowerControlAdjustmentStates  ENUMERATED { sameAsFci2, separateClosedLoop }     OPTIONAL,  -- Need S
    ...,
    [[
    pathlossReferenceRSList-r16  SEQUENCE (SIZE(1..maxNrofSRS-PathlossReferenceRS-r16-1)) OF PathlossReferenceRS-Config  OPTIONAL,  -- Need M
    ]]
} physCellId                 PhysCellId                                                   OPTIONAL,  -- Need M
```

500 → PUCCH-ConfigCommon
502 → PUCCH-PowerControl
504 → pathlossReferenceRSs
506 → SRS-ResourceSet

Figure 5

```
CSI-ReportConfig ::=        SEQUENCE {
    reportConfigId              CSI-ReportConfigId,
    carrier                     ServCellIndex                   OPTIONAL,   -- Need S
    resourcesForChannelMeasurement  CSI-ResourceConfigId,
    csi-IM-ResourcesForInterference CSI-ResourceConfigId        OPTIONAL,   -- Need R
    nzp-CSI-RS-ResourcesForInterference CSI-ResourceConfigId    OPTIONAL,   -- Need R
    <unrelated part omitted>
    reportQuantity              CHOICE {
        none                        NULL,
        cri-RI-PMI-CQI              NULL,
        cri-RI-i1                   NULL,
        cri-RI-i1-CQI               SEQUENCE {
            pdsch-BundleSizeForCSI      ENUMERATED {n2, n4}
        }                                                       -- Need S
    },
    cri-RI-CQI                  NULL,
    cri-RSRP                    NULL,
    ssb-Index-RSRP              NULL,
    cri-RI-LI-PMI-CQI           NULL,
    cri-RSRP-DI                 NULL,
    ssb-Index-RSRP-DI           NULL,
    cri-SINR-DI                 NULL,
    ssb-Index-SINR-DI           NULL
    },
OPTIONAL
},
```

Figure 7

```
CSI-ReportConfig ::=    SEQUENCE {
    reportConfigId              CSI-ReportConfigId,
    carrier                     ServCellIndex                                           OPTIONAL,    -- Need S
    resourcesForChannelMeasurement    CSI-ResourceConfigId,
    csi-IM-ResourcesForInterference   CSI-ResourceConfigId                              OPTIONAL,    -- Need R
    nzp-CSI-RS-ResourcesForInterference   CSI-ResourceConfigId                          OPTIONAL,    -- Need R
    <unrelated part omitted>
}

CSI-ResourceConfig ::=   SEQUENCE {
    csi-ResourceConfigId        CSI-ResourceConfigId,
    <unrelated part omitted>
    bwp-Id                      BWP-Id,
    resourceType                ENUMERATED { aperiodic, semiPersistent, periodic },
    physCellId                  PhysCellId                                              OPTIONAL,    -- Need
    ...
}
```

Figure 8

```
CSI-ReportConfig ::=        SEQUENCE {
    reportConfigId              CSI-ReportConfigId,
    carrier                     ServCellIndex                                                           OPTIONAL, -- Need S
    resourcesForChannelMeasurement  CSI-ResourceConfigId,
    csi-IM-ResourcesForInterference CSI-ResourceConfigId                                                OPTIONAL, -- Need R
    nzp-CSI-RS-ResourcesForInterference CSI-ResourceConfigId                                            OPTIONAL, -- Need R
    <unrelated part omitted>
}

CSI-ResourceConfig ::=      SEQUENCE {
    csi-ResourceConfigId        CSI-ResourceConfigId,
    csi-RS-ResourceSetList      CHOICE {
        nzp-CSI-RS-SSB              SEQUENCE {
            nzp-CSI-RS-ResourceSetList  SEQUENCE (SIZE (1..maxNrofNZP-CSI-RS-ResourceSetsPerConfig)) OF NZP-CSI-RS-ResourceSetId    OPTIONAL, -- Need R
            csi-SSB-ResourceSetList     SEQUENCE (SIZE (1..maxNrofCSI-SSB-ResourceSetsPerConfig)) OF CSI-SSB-ResourceSetId
        },
        csi-IM-ResourceSetList      SEQUENCE (SIZE (1..maxNrofCSI-IM-ResourceSetsPerConfig)) OF CSI-IM-ResourceSetId
    },
    <unrelated part omitted>
}

CSI-SSB-ResourceSet ::=     SEQUENCE {
    csi-SSB-ResourceSetId       CSI-SSB-ResourceSetId,
    csi-SSB-ResourceList        SEQUENCE (SIZE(1..maxNrofCSI-SSB-ResourcesPerSet)) OF SSB-Index,
    physCellIdList              SEQUENCE (SIZE(1..maxNrofCSI-SSB-ResourcesPerSet)) OF PhysCellId         OPTIONAL,
}
```

Figure 14

```
1500
   CSI-ReportConfig ::=   SEQUENCE {
      reportConfigId           CSI-ReportConfigId,
      carrier                  ServCellIndex                                               OPTIONAL,   -- Need S
      resourcesForChannelMeasurement                                                                   
      csi-IM-ResourcesForInterference  SEQUENCE (SIZE (1..maxNrofCsrSet)) OF CSI-ResourceConfigId,
                                       SEQUENCE (SIZE (1..maxNrofIsrSet)) OF CSI-ResourceConfigId,
OPTIONAL,   -- Need R
      nzp-CSI-RS-ResourcesForInterference  SEQUENCE (SIZE (1..maxNrofIsrSet)) OF CSI-ResourceConfigId
OPTIONAL,   -- Need R
      <unrelated part omitted>
   }
                    1502
1504
   CSI-ResourceConfig ::=   SEQUENCE {
      csi-ResourceConfigId      CSI-ResourceConfigId,
      csi-RS-ResourceSetList    CHOICE {
         nzp-CSI-RS-ResourceSetList  SEQUENCE (SIZE (1..maxNrofNZP-CSI-RS-ResourceSetsPerConfig)) OF NZP-CSI-RS-
ResourceSetId,
         csi-SSB-ResourceSetList     SEQUENCE (SIZE (1..maxNrofCSI-SSB-ResourceSetsPerConfig)) OF CSI-SSB-
ResourceSetId
OPTIONAL,   -- Need R
         csi-IM-ResourceSetList      SEQUENCE (SIZE (1..maxNrofCSI-IM-ResourceSetsPerConfig)) OF CSI-IM-ResourceSetId
OPTIONAL,   -- Need R
      },
      physCellId                PhysCellId                                                OPTIONAL,
      <unrelated part omitted>
   }
```

Figure 15

```
CSI-ReportConfig ::=   SEQUENCE {
    reportConfigId            CSI-ReportConfigId,
    carrier                   ServCellIndex                  OPTIONAL,  -- Need S
    resourcesForChannelMeasurement    CSI-ResourceConfigId,
    csi-IM-ResourcesForInterference   CSI-ResourceConfigId   OPTIONAL,  -- Need R
    nzp-CSI-RS-ResourcesForInterference  CSI-ResourceConfigId OPTIONAL, -- Need R
    <unrelated part omitted>
}
CSI-ResourceConfig ::=    SEQUENCE {
    csi-ResourceConfigId      CSI-ResourceConfigId,
    csi-RS-ResourceSetList    CHOICE {
        SEQUENCE {
            nzp-CSI-RS-ResourceSetList    SEQUENCE (SIZE (1..maxNrofNZP-CSI-RS-ResourceSetsPerConfig)) OF NZP-CSI-RS-
ResourceSetId                                                 OPTIONAL, -- Need R
            csi-SSB-ResourceSetList       SEQUENCE (SIZE (1..maxNrofCSI-SSB-ResourceSetsPerConfig)) OF CSI-SSB-
ResourceSetId
        },
        csi-IM-ResourceSetList            SEQUENCE (SIZE (1..maxNrofCSI-IM-ResourceSetsPerConfig)) OF CSI-IM-ResourceSetId OPTIONAL, -- Need R
    },
    groupBasedBeamReportingType2          CHOICE (enabled, disabled)                                OPTIONAL
    <unrelated part omitted>
}
```

UNSYNCHRONIZED MULTI-TRANSMISSION RECEPTION POINT SCHEDULING OPERATION

CROSS-REFERENCE TO RELATED APPLICATIONS

This application is a U.S. National Stage Application of PCT/CN2020/122274, filed Oct. 20, 2020. The disclosure of which is herein incorporated by reference in its entirety for all purposes.

BACKGROUND

Third Generation Partnership Project (3GPP) networks provide for intra-cell multi-transmission reception point (TRP) operation. In Rel-16, intra-cell multi-TRP operation has been supported, where it is assumed that propagation delay difference between signals from different transmission reception points (TRPs) should be within a cyclic prefix (CP).

BRIEF DESCRIPTION OF THE DRAWINGS

FIG. 4 illustrates example information elements associated with the procedure of FIG. 3 in accordance with some embodiments.

FIG. 5 illustrates example information elements associated with the procedure of FIG. 3 in accordance with some embodiments.

FIG. 7 illustrates an example information element associated with the procedure of FIG. 6 in accordance with some embodiments.

FIG. 8 illustrates example information elements associated with the procedure of FIG. 6 in accordance with some embodiments.

FIG. 14 illustrates an example information element associated with the procedure of FIG. 12 and the procedure of FIG. 13 in accordance with some embodiments.

FIG. 15 illustrates example information elements associated with the procedure of FIG. 12 and the procedure of FIG. 13 in accordance with some embodiments.

FIG. 16 illustrates example information elements associated with the procedure of FIG. 12 and the procedure of FIG. 13 in accordance with some embodiments.

DETAILED DESCRIPTION

Figure 1:
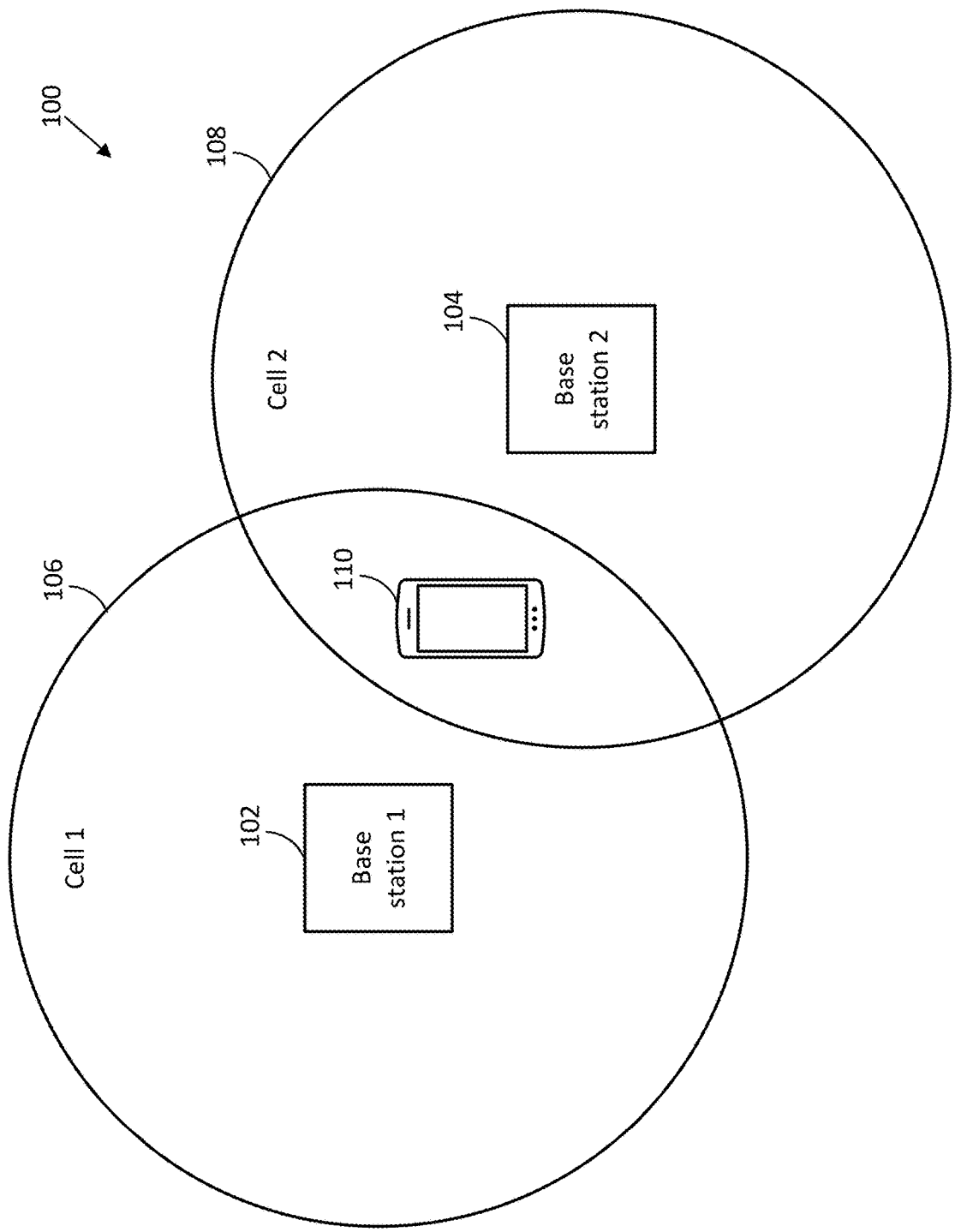
FIG. 1 illustrates an example network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates an example network environment 100 in accordance with some embodiments. In particular, the network environment 100 illustrates a portion of a radio access network (RAN) that may support operation of one or more user equipments (UEs).

The network environment 100 may include one or more base stations (such as the gNB 2200 (FIG. 22)). In the illustrated embodiment, the network environment 100 includes a first base station 102 and a second base station 104. The first base station 102 and the second base station 104 may be part of the RAN) (such as a third generation partnership project (3GPP) RAN). While two base stations are illustrated in the RAN in the network environment 100 in the illustrated embodiment, it should be understood that one or more base stations may be included in the RAN in other embodiments, where each of the base stations may have the features, or similar features, to the first base station 102 and the second base station 104. The first base station 102 and the second base station 104 may exchange transmissions with UEs, the transmissions may facilitate operations of the UEs. For example, the base stations (such as the first base station 102 and the second base station 104) of the RAN may be responsible for the definition of functions, requirements, and/or interfaces for the UEs. The RAN may be based on new wide band, multimode, flexible radio access. The base stations of the RAN may configure the UEs for use within the RAN.

The network environment 100 may further include one or more cells. The network environment 100 illustrates a first cell 106 and a second cell 108 in the illustrated embodiment. The first cell 106 and the second cell 108 may be physical cells. The cells may be correspond to one or more base stations. In the illustrated environment, the first cell 106 may correspond to the first base station 102 and the second cell 108 may correspond to the second base station 104. In particular, the first base station 102 may manage the first cell 106 and the second base station 104 may manage the second cell 108. It should be understood that base stations may manage one or more cells in other embodiments.

The network environment 100 may further include a UE 110. In the illustrated embodiment, the UE 110 may connect with the first base station 102 and the second base station 104, where the first cell 106 and the second cell 108 may serve the UE 110. The UE 110 may be capable of entering inter-cell multi-transmission reception point (TRP) operation with the first base station 102 and the second base station 104. The base stations and/or cells may be referred to as the TRPs of the UE 110 when the UE 110 is in multi-TRP operation with the base stations. When in inter-cell multi-TRP operation with the first base station 102 and the second base station 104, the UE 110 may exchange signals with the first base station 102 and the second base station 104.

Inter-cell multi-TRP may present issues that intra-cell multi-TRP did not. In Rel-16 (3GPP Organizational Partners. 3rd Generation Partnership Project; Technical Specification Group Radio Access Network. (Release 16)), intra-cell multi-TRP operation has been supported, where it is assumed that propagation delay difference between signals from different transmission reception points (TRPs) should be within a cyclic prefix (CP). In contrast, in Rel-17 (3GPP Organizational Partners. 3rd Generation Partnership Project; Technical Specification Group Radio Access Network. (Release 17)), inter-cell multi-TRP is going to be supported. It is possible that the propagation delay difference between UE to different TRPs associated with different cells could be above a CP, e.g. D2-D1 may be larger than a CP. For example, inter-cell multi-TRP may have propagation delays between signals from different TRPs associated with different cells that are above a CP. This would lead to separate timing advance group (TAG) for uplink signals toward two different TRPs. Having the propagation delay being above the CP could lead to separate TAGs for uplink signals transmitted toward different TRPs. The approaches described throughout this disclosure may address some issues presented by inter-cell multi-TRP.

Figure 2:
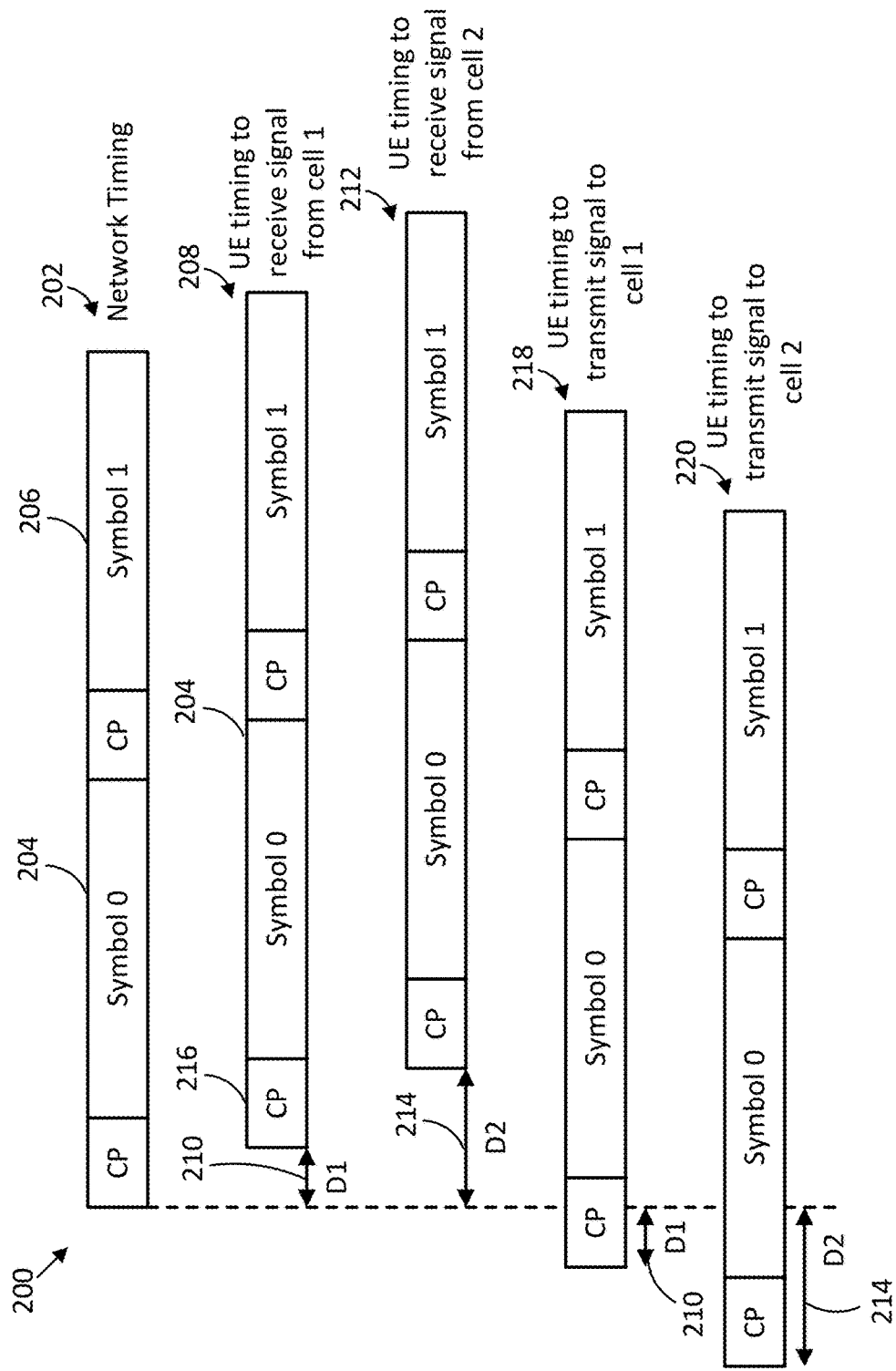
FIG. 2 illustrates an example timing graph in accordance with some embodiments.

FIG. 2 illustrates an example timing graph 200 in accordance with some embodiments. In particular, the timing graph 200 illustrates example timing for signals for a UE between different cells. The cells may be cells that may be established with inter-cell multi-TRP for the UE.

The timing graph 200 includes a network timing 202. The network timing 202 shows an example timing that a first symbol 204 and a second symbol 206 are to occur according to a timing of a network. For example, the network timing 202 may illustrate a timing of a RAN in which a UE may establish inter-cell multi-TRP.

The timing graph 200 may include a first cell receive timing 208. The first cell receive timing 208 may indicate a time that a first symbol and a second symbol would be received by the UE when transmitted from a first cell. The timing of the first cell receive timing 208 may be delayed from the network timing 202 by a first timing delay (D1) 210. In particular, the first symbol and the second symbol of the first cell receive timing 208 if transmitted by the first cell at the network timing 202 would be received by the UE at the D1 210 after the network timing 202.

The timing graph 200 may include a second cell receive timing 212. The second cell receive timing 212 may indicate a time that a first symbol and a second symbol would be received by the UE when transmitted from a second cell. The timing of the second cell receive timing 212 may be delayed from the network timing 202 by a second timing delay (D2) 214. In particular, the first symbol and the second symbol of the second cell receive timing 212 if transmitted by the second cell at the network timing 202 would be received by the UE at the D2 214 after the network timing 202. As can be seen, a timing difference between the first cell receive timing 208 and the second cell receive timing 212 may be greater than a CP 216 for the symbols. This may cause issues in the scheduling of signals transmitted to the UE from the first cell and the second cell. For example, a signal transmitted in the first symbol from the second cell receive timing 212 may overlap with a signal transmitted in the second symbol from the first cell receive timing 208. If the signals are in the same bandwidth part (BWP), the transmission of the signals in overlapping symbols may be incompatible.

The timing graph 200 may include a first cell transmit timing 218. The first cell transmit timing 218 may indicate a time when a first symbol and a second symbol are to be transmitted from the UE to arrive at the first cell at the network timing. The timing of the first cell transmit timing 218 may be ahead of the network timing 202 by the D1 210. In particular, if the first symbol and the second symbol are transmitted by the UE at the first cell transmit timing 218, which is D1 210 prior to the network timing 202, the first symbol and the second symbol would be received by the first cell at the network timing 202.

The timing graph 200 may include a second cell transmit timing 220. The second cell transmit timing 220 may indicate a time when a first symbol and a second symbol are to be transmitted from the UE to arrive at the second cell at the network timing. The timing of the second cell transmit timing 220 may be ahead of the network timing 202 by the D1 210. In particular, if the first symbol and the second symbol are transmitted by the UE at the second cell transmit timing 220, which is D2 214 prior to the network timing 202, the first symbol and the second symbol would be received by the second cell at the network timing 202. As can be seen, a timing difference between the first cell transmit timing 218 and the second cell transmit timing 220 may be greater than a CP 216 for the symbols. This may cause issues in the scheduling of signals transmitted to the UE from the first cell and the second cell. For example, a signal transmitted in the first symbol from the first cell transmit timing 218 may overlap with a signal transmitted in the second symbol from the second cell transmit timing 220. If the signals are in the same bandwidth part (BWP), the transmission of the signals in overlapping symbols may be incompatible.

The inter-cell multi-TRP operation, and the possibility of overlapping symbols, may present multiple issues. The UE may need to apply different timing to receive/transmit signals from different cells. How to let UE know the transmitting/receiving cell for a particular signal may be a first issue.

It may be possible that cell 1 schedules signal for cell 2. For example, it may be possible for the first cell 106 to schedule signals for the second cell 108. how to count the scheduling offset since different timing could be applied to different cells may be a second issue.

Figure 3:
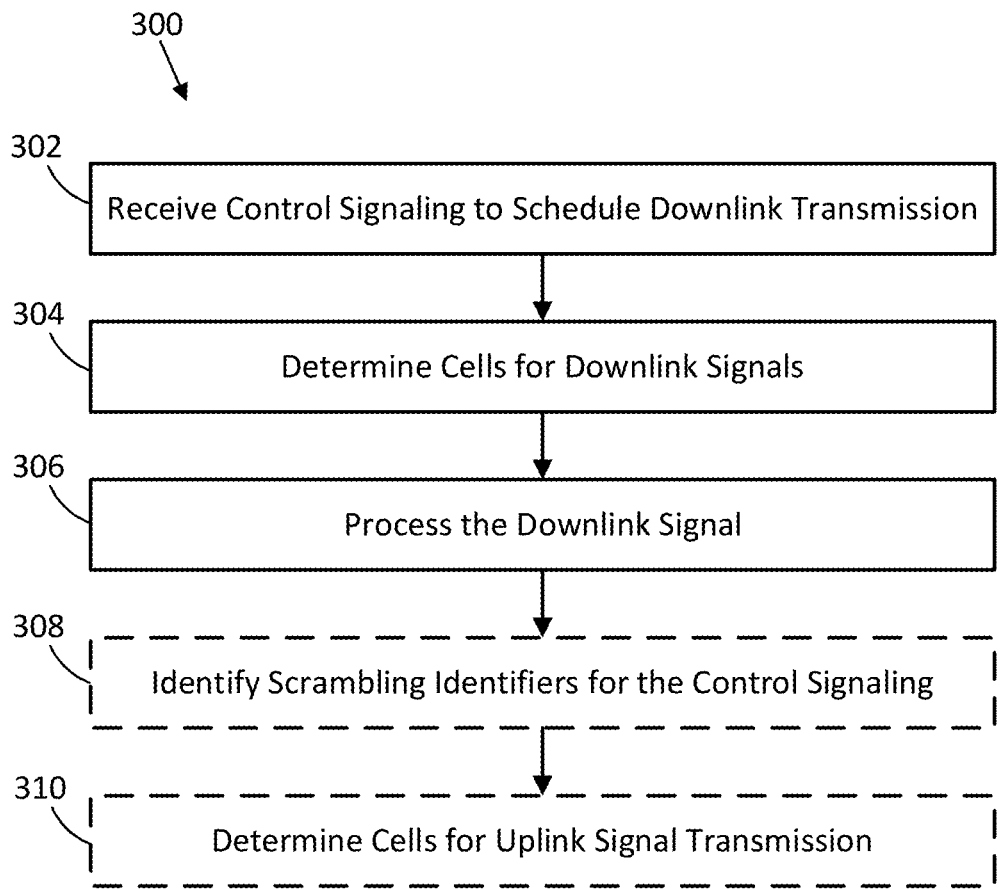
FIG. 3 illustrates an example procedure for UE awareness in accordance with some embodiments.

Several UE capabilities are defined per slot, e.g. number of beam management reference signals per slot. For example, a number of beam management reference signals per slot may be defined for the UE capabilities. The slot boundary for different cells could be different at UE side, and how to count such UE capability could be a third issue FIG. 3 illustrates an example procedure 300 for UE awareness in accordance with some embodiments. The procedure 300 may be performed by a UE (such as the UE 110 (FIG. 1)). The procedure 300 may allow the UE to know a transmitting/receiving cell for a particular signal.

The procedure 300 may include receiving control signaling to schedule downlink transmission in 302. For example, the UE may receive control signaling to schedule a downlink transmission by a downlink signal. The control signaling may include beam indication signaling or explicit association configuration information. For a first option for UE to aware the transmitting/receiving TRPs/cells for a particular signal, CORESETPoolIndex or physical cell ID can be associated with the beam indication signaling, e.g. transmission configuration indication (TCI) or spatial elation indication for a particular signal. In particular, this first option may address the first issue of how to let UE now the transmitting/receiving cell for a particular signal. For example, the control signaling may include a control resource set (CORESET) pool index (CORESETPoolIndex) or a physical cell identifier (ID). UE may assume signals with different CORESETPoolIndex or physical cell ID are from different TRPs/cells. By default, UE may assume the signal is associated with CORESETPoolIndex=0 or the first/primary serving cell. For example, the association can be provided by RRC or MAC control element (CE). In some embodiments, the CORESETPoolIndex or the physical cell ID may be associated with beam indication signaling, such as transmission configuration indication (TCI) or spatial relation indication for a particular signal. If both CORESETPoolIndex and physical cell ID are provided for a signal, the signals associated with the same CORESETPoolIndex may be associated with the same physical cell ID.

For a second option for UE to aware the transmitting/receiving TRPs/cells for a particular signal, CORESETPoolIndex or physical cell ID can be explicitly configured for a particular signal by RRC or MAC CE. For example, relationships between the CORESETPoolIndex or the physical cell ID and the cells may be explicitly configured. The control signaling may be received by radio resource control (RRC) or medium access control (MAC) control element (CE). By default, UE may assume the signal is configured with CORESETPoolIndex=0 or the first/primary serving cell. In one example, physical cell ID can be configured per SRS resource/resource set, PUCCH resource/resource group, Control Resource Set (CORESET). The cell for PDSCH/PUSCH may be determined by the scheduling PDCCH or indicated/configured SRS resource indicator (SRI). If both CORESETPoolIndex and physical cell ID are provided for a signal, the signals associated with the same CORESETPoolIndex may be associated with the same physical cell ID.

The procedure 300 may include determining cells for downlink signals in 304. The UE may determine cells and/or TRPs for downlink signaling based on the CORESETPoolIndex or the physical cell ID. For example, the CORESETPoolIndex or the physical cell ID may configure a downlink signal for downlink signaling to be transmitted by a cell associated with the CORESETPoolIndex or the physical cell ID. In some embodiments, the UE may assume signals with different CORESETPoolIndex or physical cell ID are from different cells and/or TRPs. In other embodiments, the physical cell ID may be configured per sounding reference signal (SRS) resource/resource set, physical uplink control channel (PUCCH) resource/resource group, and/or CORESET. The cell for physical downlink shared channel (PDSCH)/physical uplink shared channel (PUSCH) may be determined by a scheduling physical downlink control channel, or indicated/configured SRS resource indicator (SRI). The UE may assume a signal is associated with CORESETPoolIndex=0 or a first/primary serving cell by default.

The procedure 300 may include processing downlink signals in 306. For example, the downlink signals based on determination that the downlink signals are to be transmitted by respective cells to receive the downlink transmission.

The procedure 300 may include identifying scrambling IDs for the control signaling in 308. For both option 1 and option 2 for UE to aware the transmitting/receiving TRPs/cells for a particular signal, different scrambling ID can be configured by RRC signaling for a particular signal associated with different cells. For example, scrambling IDs may be configured by RRC signaling. Different scrambling IDs for particular signal may be associated with different cells. Additional RRC parameters can be introduced, e.g. dataScramblingIdentityPUSCH2 and hoppingId2, which can be used for signals associated with the second cell. For example, additional RRC parameters may be introduced for neighbor cells in addition to the first/primary cell. For example, RRC parameters dataScramblingIdentityPUSCH2 and hoppingId2 may be introduced and can be used for signals associated with a second cell. For uplink signal, the pathloss reference signal may be from the same cell as the associated cell. For example, for uplink signaling, a pathloss reference signal may be from a same cell as the cell determined for the uplink transmission. Additional pathloss reference signal list, e.g. pathlossReferenceRSToAddModList2, pathlossReferenceRSs2, can be introduced, which can be used for signals associated with the second cell. For example, an additional pathloss reference signal list may be introduced, which can be used for signals associated with neighbor cells in addition to the first/primary cell. For PRACH, the association is determined by the associated SSB. For example, for physical random access channel, associations between the scrambling IDs and cells may be determined by associated synchronization signal/physical downlink broadcast channel (SSB).

FIG. 4 illustrates example information elements 400 associated with the procedure 300 of FIG. 3 in accordance with some embodiments. The information elements 400 may include a PUSCH configuration (PUSCH-Config) information element 402 and a PUSCH power control (PUSCH-PowerControl) information element 404. The PUSCH-Config information element 402 and the PUSCH-PowerControl information element 404 may include the further RRC parameters introduced in accordance with the procedure 300. For example, the PUSCH-Config information element 402 may include a data scrambling identity PUSCH parameter for a second cell (dataScramblingIdentityPUSCH2). The PUSCH-PowerControl information element 404 may include a pathloss reference signal to release list parameter for the second cell (pathlossReferenceRSToAddModList2) and a pathloss reference signal to release list parameter for the second cell (pathlossReferenceRSToReleaseList2).

FIG. 5 illustrates example information elements 500 associated with the procedure 300 of FIG. 3 in accordance with some embodiments. The information elements 500 may include a PUCCH configuration common (PUCCH-ConfigCommon) information element 502, a PUCCH power control (PUCCH-PowerControl) information element 504, and a SRS resource set (SRS-ResourceSet) information element 506. The PUCCH configuration common (PUCCH-ConfigCommon) information element 502, the PUCCH power control (PUCCH-PowerControl) information element 504, and the SRS resource set (SRS-ResourceSet) information element 506 may include the further RRC parameters introduced in accordance with the procedure 300. For example, the PUCCH-ConfigCommon information element 502 may include a hopping ID parameter for the second cell (hoppingId2). The PUCCH-PowerControl information element 504 may include a pathloss reference signal parameter for the second cell (pathlossReferenceRSs2). The SRS-ResourceSet information element 506 may include a physical cell identifier parameter (physCellId).

Figure 6:
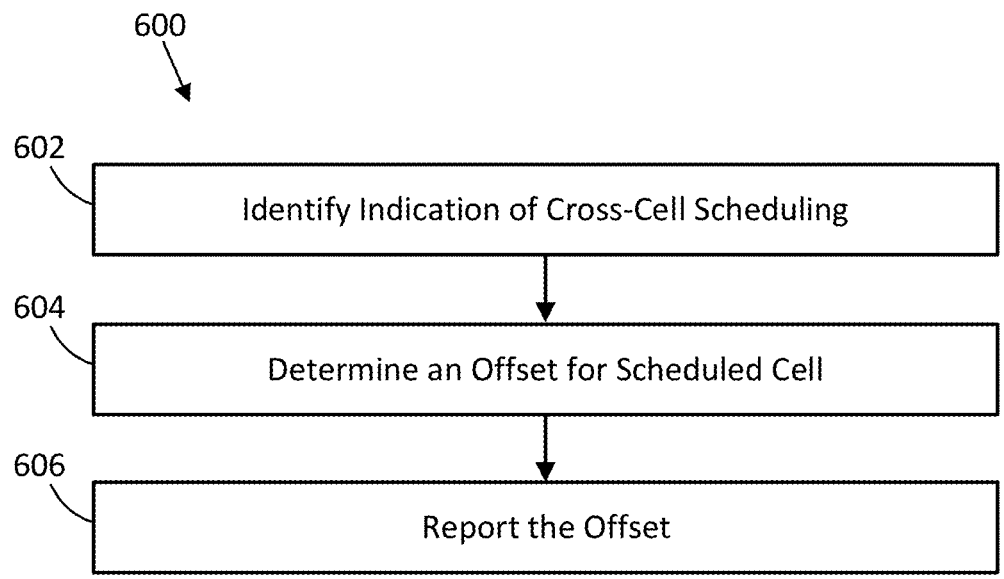
FIG. 6 illustrates an example procedure for cross-cell scheduling in accordance with some embodiments.

FIG. 6 illustrates an example procedure 600 for cross-cell scheduling in accordance with some embodiments. The procedure 600 may be performed by a UE (such as the UE 110 (FIG. 1)). The procedure 600 may allow the UE to count scheduling offset for cross-cell scheduled signals. In some embodiments, the procedure 600 may be performed as a continuation of the procedure 300 (FIG. 3).

The procedure 600 may include identifying an indication of cross-cell scheduling in 602. In particular, the UE may identify an indication from a scheduling cell of cross-cell scheduling for transmission of a signal to a scheduled cell.

The procedure 600 may include determining an offset for the scheduled cell in 604. For cross-cell scheduling, the indicated scheduling offset is based on the network side timing. For example, for the cross-cell scheduling, the offset can be based on network side timing. The minimal scheduling offset for cross-cell scheduling can be determined by the minimal intra-cell scheduling offset plus an offset. In a first option, the offset may be predefined, e.g. X (X=2) symbols for a particular subcarrier spacing. For example, the offset may be predefined. The offset may be defined as a number of symbols for a particular subcarrier spacing. In a second option, the offset may be reported by UE capability.

In a third option, the offset is determined by timing advance (TA) for the two cells. For example, the offset may be determined by timing advance for the scheduling cell and the scheduled cell. The timing difference between UL and DL in two cells may always be D1+D2. For example, a timing difference between uplink signals and downlink signal in the scheduling cell and the scheduled cell may be equal to a delay (such as the delay indicated by the D1 210 (FIG. 2)) for the scheduling cell plus a delay (such as the delay indicated by the D2 214 (FIG. 2)) for the scheduled cell. In some embodiments of the third option, given cell 1 schedules cell 2. If TA_1<TA_2, offset=Y, where TA_1 is the TA of cell 1, TA_2 is the TA of cell 2, and Y can be predefined or reported by UE capability. Otherwise, offset=Y+1, where Y can be predefined or reported by UE capability. For example, where a first cell is the scheduling cell and a second cell is the scheduled cell (where the scheduling cell schedules the transmission for the scheduled cell), if the timing advance of the first cell (TA_1) is less than the timing advance of the second cell (TA_2), the offset may be determined to be equal to Y, where Y can be predefined or reported by UE capability. If the TA_1 is greater than or equal to the TA_2, the offset may be determined to be equal to Y plus 1.

In a fourth option, if abs(D2-D1)>CP, first option/second option/third option may be used, otherwise offset=0. For example, the offset can be determined based on whether a difference between the delay for the scheduling cell and the delay for the scheduled cell is greater than a CP. If the difference is greater than the CP, one of the approaches described above for determining the offset may be implemented. If the difference is less than or equal to the CP, the offset may be determined to be equal to 0. UE can report whether abs(D2-D1) is above CP.

The procedure 600 may include reporting the offset in 606. In particular, the UE may report the offset to the scheduling cell and/or the scheduled cell. Reporting the offset may include reporting whether the difference between the delay for the scheduling cell and the delay for the scheduled cell is greater than the CP. For example, UE can report whether abs(D2-D1) is above CP in the fourth option. In a first option to report whether abs(D2-D1)>CP, in L1-RSRP/L1-SINR report for resources from neighbor cell, UE be configured to report a delay indicator (DI) to tell gNB whether the reference signals are received with a delay difference larger than a CP. For example, reporting whether the difference is greater than the CP may include reporting a delay indicator (DI) to the scheduling cell (such as to a base station of the scheduling cell) to indicate whether reference signals are received by the UE with a delay difference larger than the CP. The DI may be included in a layer 1 reference signal received power (L1-RSRP)/layer 1 signal to noise and interference ratio (L1-SINR) for resources from the scheduled cell. In some embodiments of the first option, new report quantities such as 'ssb-Index-RSRP-DI', 'cri-RSRP-DI', 'ssb-Index-SINR-DI', 'cri-SINR-DI' can be configured. For example, new report quantities can be configured for reporting the DI, such as an SSB index RSRP DI parameter (ssb-Index-RSRP-DI), a channel state information reference signal (CRI) index RSRP DI parameter (cri-RSRP-DI), an SSB index SINR DI parameter (ssb-Index-SINR-DI), and/or a CRI index SINR DI parameter (cri-SINR-DI). In some other embodiments of the first option, physical cell ID can be added for each channel measurement resource (CMR) and when the channel measurement resources are from neighbor cell, UE may report DI. For example, a physical cell ID can be added for each channel measurement resource (CMR). When the CMRs are from neighbor cells, the UE may report the DI. In one option of the first option, number of reported DI equals to number of configured CMR sets associated with cell ID different from the first cell ID. For example, a number of reported DIs may be equal to a number of configured CMR sets associated with physical cell IDs different from a first cell ID (such as an ID for the scheduling cell). In another option of the first option, one DI is reported per SSB resource indicator or CSI-RS resource indicator.

For example, the DI may be reported per SSB resource indicator or CSI-RS resource indicator.

In a second option to report whether abs(D2-D1)>CP, in L1-RSRP/L1-SINR report for resources from neighbor cell, UE can report a MAC CE to indicate the DI for each physical cell in the physical cell groups configured by RRC signaling. For example, the offset may be reported by a MAC CE to indicate the DI for each physical cell in the physical cell groups. The reporting of the MAC CE may be configured by RRC signaling. In some embodiments of the second option, a bitmap can be configured to indicate the DI for each physical cell, where value "0" of bit x may indicate abs(Dx-D1)<=CP and value "1" of bit x may indicate abs(Dx-D1)>CP. Dx may be a DI of a cell x and D1 may be a DI of a first cell. For example, a bitmap may be configured to indicate the DI for each physical cell, where a value of 0 of a bit corresponding to the scheduled cell may indicate that a difference between the delay of the scheduled cell and the scheduling cell is less than or equal to the CP, and where a value of 1 of the bit may indicate that the difference is greater than the CP.

FIG. 7 illustrates an example information element 700 associated with the procedure 600 of FIG. 6 in accordance with some embodiments. The information element 700 may be a CSI report configuration (CSI-ReportConfig) information element. The information element may include a CRI RSRP DI parameter (cri-RSRP-DI), the ssb-Index-RSRP-DI parameter, a CRI SINR DI parameter (cri-SINR-DI) parameter, and the ssb-Index-SINR-DI parameter in accordance with the procedure 600.

FIG. 8 illustrates example information elements 800 associated with the procedure 600 of FIG. 6 in accordance with some embodiments. The information elements 800 may include a CSI-ReportConfig information element 802 and a CSI resource configuration (CSI-ResourceConfig) information element 804. The CSI-ReportConfig information element may include one or more of the features of the information element 700 (FIG. 7). The CSI-ResourceConfig information element 804 may include a physical cell ID (physCellId) corresponding to the scheduled cell.

Figure 9:
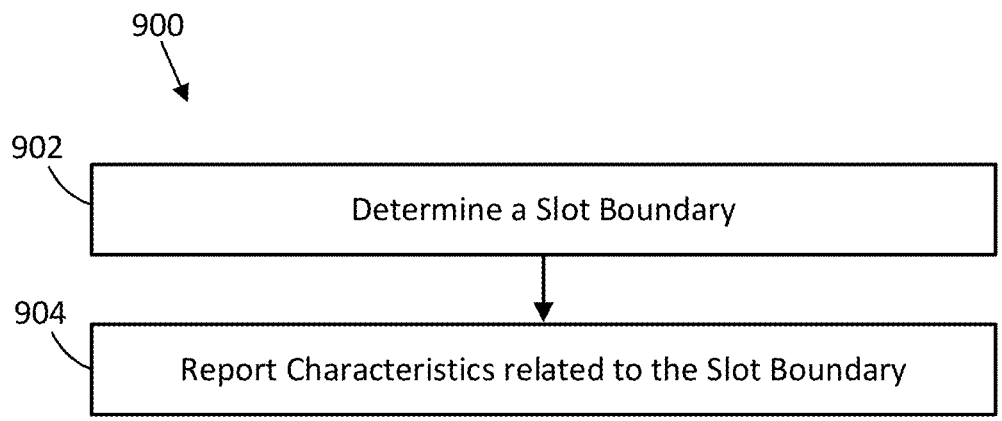
FIG. 9 illustrates an example procedure related to user equipment capabilities in accordance with some embodiments.

FIG. 9 illustrates an example procedure 900 related to UE capabilities in accordance with some embodiments. In particular, the procedure 900 may be utilized for identifying slot boundaries for different cells and/or to count the slot boundary for UE capability for different cells. For example, the procedure may be utilized to address the third issue of the slot boundary for different cells could be different at UE side, and how to count such UE capability. The procedure 900 may be utilized for unsynchronized inter-cell multi-TRP operation. There are several UE capabilities defined in "per slot" granularity, e.g. beamManagementSSB-CSI-RS, maxNumberRxTxBeamSwitchDL and so on, as defined in 38.802 (3GPP Organizational Partners. (2017-09). 3rd Generation Partnership Project; Technical Specification Group Radio Access Network; Study on New Radio Access Technology Physical Layer Aspect. (3GPP TR 38.802 V14.2.0)). For example, some UE capabilities may be defined in per slot granularity, such as a beam management SSB CSI-RS (beamManagementSSB-CSI-RS) and/or maxNumberRxTxBeamSwitchDl. Further some restrictions are also defined in slot level, e.g. maximum number of blind detection, as defined in 38.213 (3GPP Organizational Partners. (2020-09). $3^{rd}$ Generation Partnership Project; Technical Specification Group Radio Access Network; NR; Physical Layer Procedures for Control. (3GPP RS 38.213 V16.3.0)), which can be considered as a UE capability without signaling. Some restrictions may also be defined in slot level, such as a maximum number of blind detection. The restrictions may be considered as a UE capability without signaling.

The procedure 900 may include determining a slot boundary in 902. For unsynchronized inter-cell multi-TRP operation, the following options are provided to count the slot boundary for corresponding UE capabilities. In a first option, the granularity could be extended to be X times of a slot duration when calculating the UE capabilities. For example, a granularity for a slot boundary can be extended to be a multiple of a slot duration when calculating UE capabilities. The UE may determine a multiplier (X) of the slot duration. In some embodiments of the first option, X can be predefined, e.g. X=1. For example, the multiplier may be predefined. The multiplier may be 1.2 in some embodiments. In other embodiments of the first option, X can be reported by UE capability. For example, the multiplier can be reported by UE capability. In other embodiments of the first option, X can be determined by the value of TAs, e.g. X=abs(TA2−TA1)/2*16*Ts/N_Ts*Ts, where Ts is the duration of a time domain sample, N_Ts indicates the total number of Ts per slot, TA2 may be a TA of a second cell, and TA1 may be a TA of a first cell. For example, the multiplier can be determined by values of timing advances (TAs) for a serving cell and a neighbor cell. For example the multiplier may be determined by the equation X=abs(TA2−TA1)/2*16*Ts/N_Ts*Ts, where TA2 is the TA for the neighbor cell, TA1 is the TA for the serving cell, Ts is the duration of a time domain sample, and N_Ts indicates a total number of Ts per slot.

In a second option, the corresponding UE capabilities can be changed as within a slot corresponding to a cell. For example, determining the slot boundary may include changing corresponding UE capabilities as within a slot corresponding to a cell for with the slot boundary is being determined. In some embodiments of the second option, the maximum number of beam management reference signals in a slot can be counted based on the number of reference signals corresponding to a cell in a slot. Some UE capabilities predefined in the spec (3GPP Organizational Partners. 3rd Generation Partnership Project; Technical Specification Group Radio Access Network. (Release 17)), e.g. maximum number of blind detection, can be counted per cell and defined as floor(K/N_cell*Y), where K is the value defined in the current specification, N_cell indicates the number of cells configured for multi-TRP operation, and Y is predefined or reported by UE capability or configured by RRC signaling.

The procedure 900 may include determine characteristics related to the slot boundary in 904. In particular, one or more of the characteristics related to the slot boundary in 902 may be reported in 904. The one or more characteristics may be reported to the serving cell and/or the neighbor cell.

Figure 10:
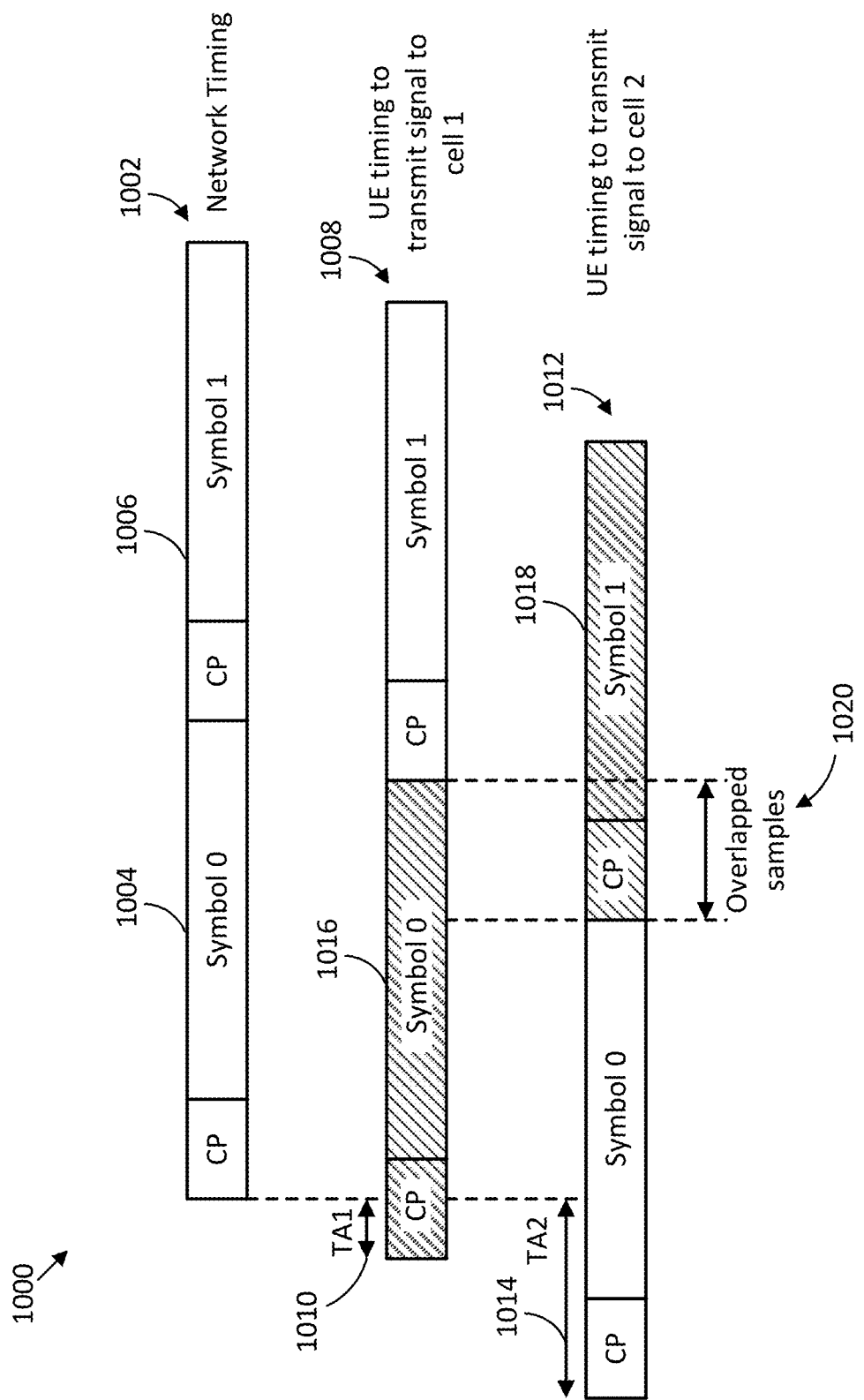
FIG. 10 illustrates another example timing graph in accordance with some embodiments.

FIG. 10 illustrates another example timing graph 1000 in accordance with some embodiments. The timing graph 1000 illustrates examples of TAs for cells that may exist in some inter-cell multi-TRP operation.

In Rel-15/Rel-16, symbol level beam switching is supported, however due to different timing, symbol level beam switching may not be possible, since the two symbols may be overlapped in time domain. As a result of radio RF constraints, UE may not be able to transmit multiple uplink signals simultaneously. How to define UE behavior to transmit the uplink signals, e.g. uplink control information (UCI), towards two different TRPs with different TAGs overlapped in time domain could be another issue. FIG. 10 illustrates and describes where the uplink signals towards two different TRPs with different TAGs could overlap in time in accordance with some instances.

The timing graph 1000 includes a network timing 1002. The network timing 1002 shows an example timing that a first symbol 1004 and a second symbol 1006 are to occur according to a timing of a network. For example, the network timing 1002 may illustrate a timing of a RAN in which a UE may establish inter-cell multi-TRP.

The timing graph 1000 may include a first cell transmit timing 1008. The first cell transmit timing 1008 may indicate a time that a first symbol and a second symbol are to be transmitted by the UE to arrive at the first cell at the network timing 1002. The timing of the first cell transmit timing 1008 may be ahead of the network timing 1002 by a first TA 1010. In particular, the first symbol and the second symbol may be transmitted as an uplink signal at the first TA 1010 ahead of the network timing 1002 to arrive at the first cell at the network timing 1002.

The timing graph 1000 may include a second cell transmit timing 1012. The second cell transmit timing 1012 may indicate a time that a first symbol and a second symbol are to be transmitted by the UE to arrive at the second cell at the network timing 1002. The timing of the second cell transmit timing 1012 may be ahead of the network timing 1002 by a second TA 1014. In particular, the first symbol and the second symbol may be transmitted as an uplink signal at the second TA 1014 ahead of the network timing 1002 to arrive at the first cell at the network timing 1002. As can be seen, due to the timing advance for the first cell transmit timing 1008 and the timing advance for the second cell transmit timing 1012, a first symbol 1016 of the first cell transmit timing 1008 may overlap with a second symbol 1018 of the second cell transmit timing 1012. In particular, overlapped samples 1020 may exist between the first symbol and the second symbol 1018. Due to the overlapped samples 1020, a signal transmitted by the UE during the first symbol 1016 and a signal transmitted by the UE during the second symbol 1018 may be incompatible. For example, the timing graph 1000 shows a first signal being transmitted in the first symbol 1016 (as shown by the lines in the first symbol 1016) and a second signal being transmitted in the second symbol 1018 (as shown by the lines in the second symbol 1018), where the signals overlap in the overlapped samples 1020. Accordingly, this situation is to be avoided by the UE. (as illustrated by the lines in the first symbol 1812)

In legacy RAN implementations, symbol level beam switching may have been supported, however due to different timing, may not have been possible since the two symbols overlapped in the time domain in the overlapped samples 1020. As a result of radio frequency constraints of the legacy RAN implements, UE may not be able to transmit multiple uplink signals simultaneously. An issue in implementing the RAN may be how to define UE behavior to transmit uplink signals (such as uplink control information (UCI)) towards different TRPs (for example, cells) with different TAGs overlapped in the time domain.

As mentioned earlier, the intra-cell multi-TRP operation may have separate TAGS for uplink signals toward different TRPs. For example, uplink signals toward the first cell of the first cell transmit timing 1008 and uplink signals toward the second cell of the second cell transmit timing 1012 may have different TAGs due to the different timings. To maintain separate timing, e.g. TAG, for signals toward different TRPs, it may require separate antenna architectures. To maintain separate timing for signals toward different TRPs, separate antenna architectures may be implemented. For example, UE may use multiple panels, where different panels can be used to transmit signals toward different TRPs. However, as a result of UE rotation/mobility, it may not be possible to always apply multiple panels to transmit/receive signals. How to maintain the same understanding between gNB and UE that UE can support unsynchronized multi-TRP operation could be one issue.

Herein disclosed are some approaches for uplink signal transmission for unsynchronized multi-TRP operation. A first issue may be how to maintain the same understanding between gNB and UEs that UE can support unsynchronized multi-TRP operation for some cells. An approach to address this issue includes UE feedback on whether it can support multi-TRP operation for the cells. Another approach to address this issue includes gNB control signaling to enable the inter-cell multi-TRP operation. A second issue may be multiplexing of uplink signals with different TAGs. An approach to address this issue includes UE behavior/feedback for uplink signal transmission with multiple TAGs in a bandwidth part. Another approach to address this issue includes gNB scheduling restriction for uplink signals with different TAGs.

Figure 11:
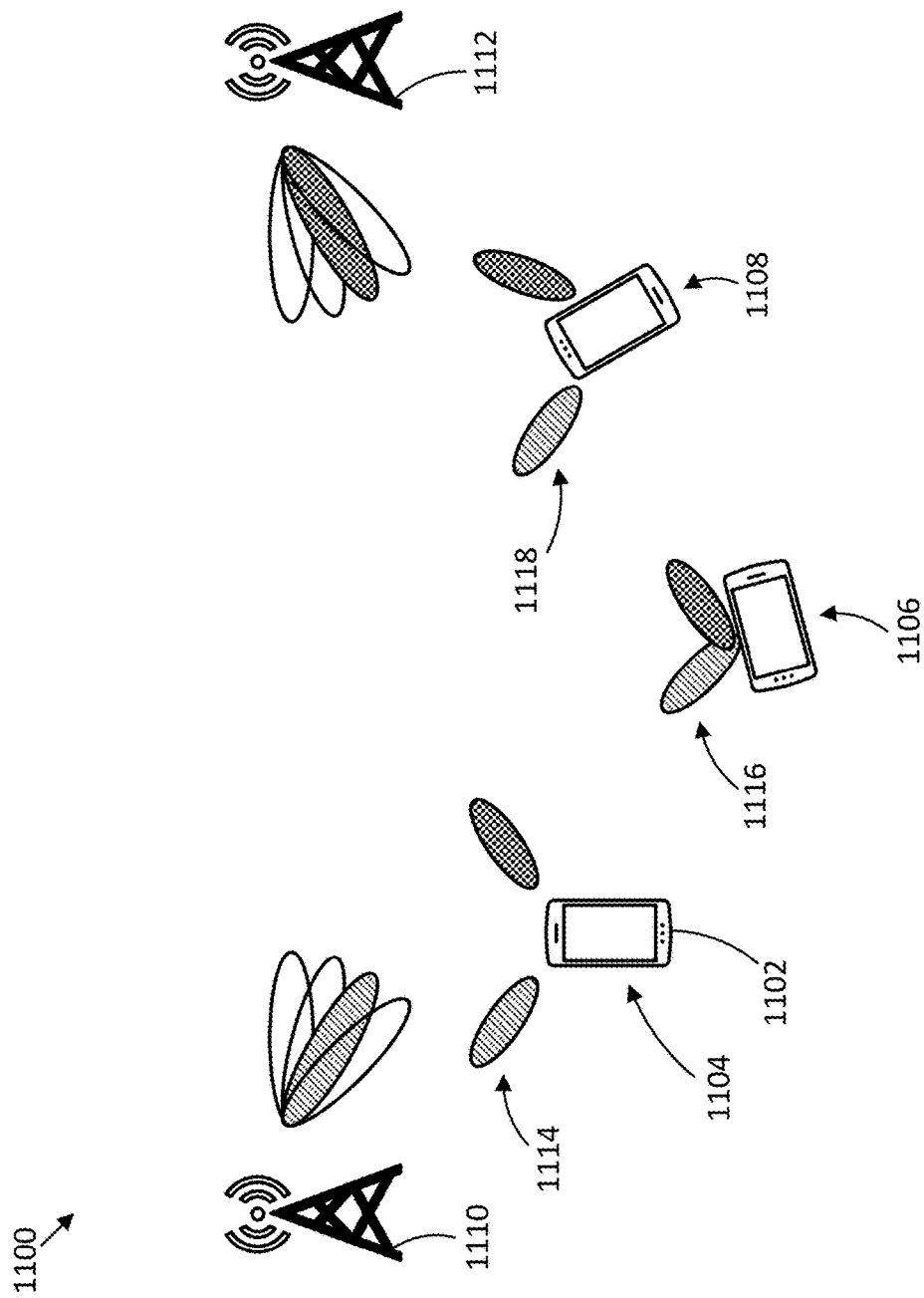
FIG. 11 illustrates another example network environment in accordance with some embodiments.

FIG. 11 illustrates another example network environment 1100 in accordance with some embodiments. The network environment 1100 may illustrate a UE 1102 in multiple positions/orientations to show possible beam directions associated with the UE 1102.

The network environment 1100 may include the UE 1102 (such as the UE 110 (FIG. 1)). The network environment 1100 illustrates the UE 1102 in a first position 1104, a second position 1106, and a third position 1108. The UE 1102 may connect to a first base station 1110 and a second base station 1112 in multi-TRP operation. In particular, the UE 1102 may communicate with the first base station 1110 and the second base station 1112 via first UE beams 1114 in the first position 1104, second UE beams 1116 in the second position 1106, and third UE beams 1118 beams in the third position 1108.

When the UE 1102 is in the first position 1104, the UE 1102 is able to apply separate timing (each panel is used to communicate with each TRP). For example, separate panels of the UE 1102 may be capable of communicating with the first base station 1110 and the second base station 1112. Due to the separate panels being utilized, the UE 1102 may apply separate timings to the panels for communication with the base stations.

When the UE 1102 is in the second position 1106, the UE 1102 is not able to apply separate timing (one panel is used to communicate with both TRPs). For example, the UE 1102 may be rotated such that a single panel is capable of communicating with the first base station 1110 and the second base station 1112, while the other panels may be unable to communicate with the first base station 1110 due to the direction of the beams. Accordingly, the single panel is to be utilized to communicate with both the first base station 1110 and the second base station 1112 when the UE 1102 is in the second position 1106. Therefore, the UE 1102 may not be able to apply multiples to transmit/receive signals when the UE 1102 is in the second position 1106.

When the UE 1102 is in the third position 1108, UE is able to apply separate timing (each panel is used to communicate with each TRP). For example, separate panels of the UE 1102 may be capable of communicating with the first base station 1110 and the second base station 1112. Due to the separate panels being utilized, the UE 1102 may apply separate timings to the panels for communication with the base stations.

As the UE 1102 transitions among the first position 1104, the second position 1106, and the third position 1108, the UE 1102 may have alternate between using multiple panels of the UE 1102 and a single panel of the UE 1102 to communicate with the first base station 1110 and the second base station 1112 due to the rotation/mobility of the UE 1102. The changing between using multiple panels or the signal panel by the UE 1102 may present an issue of maintaining understanding between the base stations and the UE 1102 of whether the UE 1102 can support unsynchronized multi-TRP operation.

Figure 12:
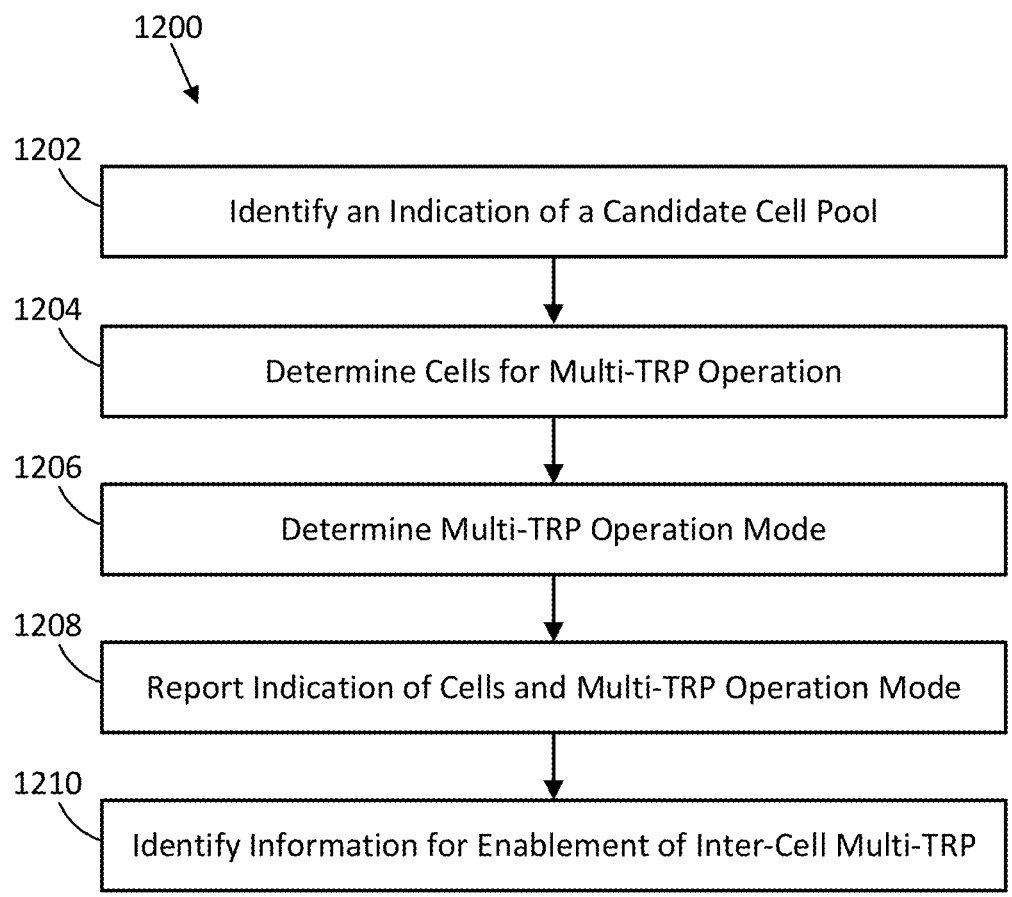
FIG. 12 illustrates an example procedure in accordance with some embodiments.

FIG. 12 illustrates an example procedure 1200 in accordance with some embodiments. The procedure 1200 may be utilized to maintain understanding between base stations and UEs as to whether the UEs can support unsynchronized multi-TRP operation for some cells. For example, a UE may perform the procedure 1200 to maintain understanding between the UE and one or more base stations connected to the UE. The UE may provide feedback of whether the UE can support multi-TRP operation for the cells of the base stations. The UE may further receive control signaling from one or more of the base stations to enable inter-cell multi-TRP operation.

To maintain the same understanding between gNB and UEs that UE can support unsynchronized multi-TRP operation for some cells, there can be the following stages. In particular, maintaining understanding between the base stations and the UE of whether the UE can support unsynchronized multi-TRP operation for some cells can involve multiple stages. In a first stage, gNB configures a candidate cell pools for multi-TRP operation. For example, a serving base station may configure a candidate cell pool for multi-TRP operation, where the candidate cell pool includes indications of multiple cells that could be utilized by the UE for multi-TRP operation. In a second stage, UE reports that it can support multi-TRP operation for some cells as well as the mode of multi-TRP, e.g. synchronized or unsynchronized. For example, the UE may report whether the UE can support multi-TRP operation for some cells, as well as the mode of the multi-TRP. For example, the UE can indicate whether it can support synchronized multi-TRP or unsynchronized multi-TRP for the cells. In a third stage, gNB enables the corresponding multi-TRP operation. For example, the serving base station may enable the corresponding multi-TRP operation in accordance with the report provided by the UE. The following options can be used to implement the stages above: Option 1: Beam report/indication based multi-TRP management; Option 2: Carrier Aggregation (CA) like multi-TRP management. For example, the stages may be implemented by beam report/indication based multi-TRP management or carrier aggregation (CA)-like multi-TRP management in embodiments.

The procedure 1200 may include identifying an indication of a candidate cell pool in 1202. In option 1 where beam report/indication based multi-TRP management is implemented, the UE may identify an indication of a candidate cell pool provided by a serving cell. The indication of the candidate cell pool may include indications of cells that may be utilized by the UE for multi-TRP. In a first stage of option 1, gNB can configure neighbor cells reference signal in channel measurement resource (CMR) and interference measurement resource (IMR) for L1-RSRP/L1-SINR report. For example, a base station may configure neighbor cells reference signal in CMR and IMR for L1-RSRP/L1-SINR report for the UE. In some embodiments of the first stage, all the CMRs corresponding to different cells can be configured within a CMR set. In other embodiments of the first stage, CMRs corresponding to different cells may be configured in different CRM sets.

In a first stage of option 2, gNB can configure a group of N candidate cells by RRC signaling. Identifying the indication of the candidate cell pool includes to identify a group of a number of candidate cells by RRC signaling. gNB may also provide some information for the candidate cells, e.g. physical cell ID, SSB location, transmission power and so on. For example, the indication may further include information for the candidate cells, such as physical cell IDs, SSB locations, and/or transmission powers for the candidate cells. gNB can also provide TCI States with RS from candidate cells. For example, the UE may further identify TCI states with RSs from the candidate cells in the indication.

The procedure 1200 may include determining cells for multi-TRP operation in 1204. In particular, the UE may analyze the cells indicated by the candidate cell pool and identify cells that the UE may determine to utilize for inter-cell multi-TRP operation.

The procedure 1200 may include determining a multi-TRP operation mode for the cells in 1206. In particular, the UE may determine whether unsynchronized multi-TRP operation is supported for the cells by the UE, synchronized multi-TRP operation is supported for cells by the UE, or multi-TRP operation is unsupported for the cells by the UE. In a second stage of option 2, gNB can configure UE to report whether it can support multi-TRPs based on current serving cell and one of the candidate cells by MAC CE. In some embodiments of the second stage, the MAC CE may include at least 1 candidate cell index from the N candidate cells as well as indication of synchronized/unsynchronized mode. In other embodiments of the second stage, the MAC CE may include N indicators, and each is used to indicate the first 2 or all the following 3 states: State 1: synchronized multi-TRP; State 2: unsynchronized multi-TRP; State 3: not recommended for multi-TRP operation. The UE may determine whether the UE can support multi-TRPs based on the serving cell and one of the candidate cells, indication of the synchronized/unsynchronized mode, the indication of the states, or some combination thereof.

The procedure 1200 may further include reporting indications of the cells and/or the multi-TRP operation mode in 1208. The UE may report the indication of the cells and/or the multi-TRP operation mode to the serving cell in a report. In the second stage of the first option to maintain the same understanding between gNB and UEs that can support unsynchronized multi-TRP operation for some cells, a type 2 group based beam reporting can be introduced, which can be enabled by RRC signaling. In a reporting instance, UE can report at least 1 SSB resource indicator (SSBRI)/CSI-RS resource indicator (CRI) corresponding to serving cell as well as its corresponding L1-RSRP/L1-SINR, at least 1 SSB resource indicator (SSBRI)/CSI-RS resource indicator (CRI) corresponding to neighbor cell as well as its corresponding L1-RSRP/L1-SINR, and synchronized/unsynchronized mode for multi-TRP operation. In some embodiments, the synchronized/unsynchronized mode may comprise an indication of synchronized/unsynchronized mode for multi-TRP operation. For the at least 1 SSB resource indicator (SSBRI)/CSI-RS resource indicator (CRI) corresponding to neighbor cell as well as its corresponding L1-RSRP/L1-SINR, an indicator can be reported to indicate whether any resource from neighbor cell is valid. Further, the L1-RSRP/L1-SINR may be reported as a differential L1-RSRP/L1-SINR with one of the L1-RSRP/L1-SINR reported for serving cell as reference.

In the second stage of the second option to maintain the same understanding between gNB and UEs that can support unsynchronized multi-TRP operation for some cells, gNB can configure UE to report whether it can support multi-TRPs based on current serving cell and one of the candidate cells by MAC CE. For example, the UE may report whether it can support multi-TRPs based on the serving cell and one of the candidate cells by MAC CE. In one option, the MAC CE may include at least 1 candidate cell index from the N candidate cells as well as indication of synchronized/unsynchronized mode. For example, the MAC CE reported by the UE may include at least one candidate cell index from the number of candidate cells as well as an indication of synchronized/unsynchronized mode. In another option, the MAC CE may include N indicators, and each is used to indicate the first 2 or all the following 3 states: State 1: synchronized multi-TRP; State 2: unsynchronized multi-TRP; State 3: not recommended for multi-TRP operation. For example, the MAC CE reported by the UE may include a number of indicators, where each of the indicators is used to indicate whether synchronized multi-TRP operation or unsynchronized multi-TRP operation is supported in some embodiments, or whether synchronized multi-TRP operation, unsynchronized multi-TRP operation, or multi-TRP operation is not recommended for the UE.

The procedure 1200 may further include identifying information for enablement of inter-cell multi-TRP of the UE in 1210. In the third stage of the first option to maintain the same understanding between gNB and UEs that can support unsynchronized multi-TRP operation for some cells, the UE may identify information for enablement of inter-cell multi-TRP provided by the serving cell. The information identified by the UE may include transmission configuration indicators (TCIs) corresponding to different cells. For example, indication of reference signals from neighbor cells may be provided as a source reference signal in a TCI state. The information may further configure different TAG indexes associated with different TCI states with neighbor cell reference signals (RSs) by RRC signaling or MAC CE when the UE reports an unsynchronized multi-TRP mode for multi-TRP operation. In some embodiments, the TAG index may be configured in a TCI state. In other embodiments, the TAG index can be configured for a TCI state group, where one TCI state group includes TCIs from the same physical cell.

In the third stage of the second option to maintain the same understanding between gNB and UEs that can support unsynchronized multi-TRP operation for some cells, the information may be identified by RRC or MAC CE provided by the serving cell. The control signaling may include at least one of a physical cell ID for an assistant TRP for multi-TRP operation, a TCI state for signals for the assistant TRP, or a TAG index for the assistant TRP. The control signal may further include a state to disable multi-TRP operation.

Figure 13:
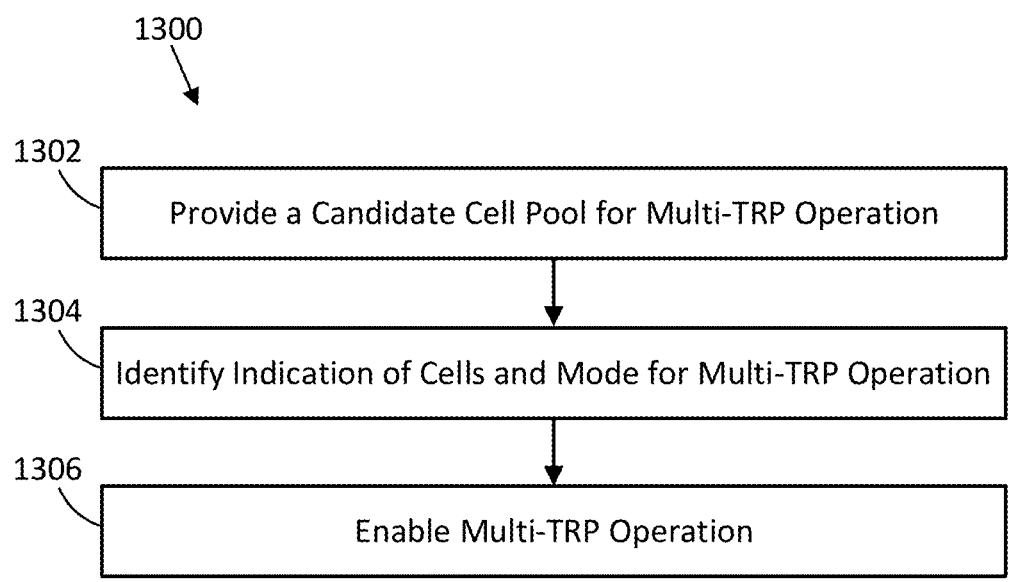
FIG. 13 illustrates another example procedure in accordance with some embodiments.

FIG. 13 illustrates another example procedure 1300 in accordance with some embodiments. The procedure 1300 may be utilized to maintain understanding between base stations and UEs as to whether the UEs can support unsynchronized multi-TRP operation for some cells. For example, a serving cell may perform the procedure 1300 to maintain understanding between the UE and one or more base stations connected to the UE.

The procedure 1300 may include providing a candidate cell pool for multi-TRP operation in 1302. In the first stage of the first option to maintain the same understanding between gNB and UEs that can support unsynchronized multi-TRP operation for some cells, gNB can configure neighbor cells reference signal in channel measurement resource (CMR) and interference measurement resource (IMR) for L1-RSRP/L1-SINR report. For example, the serving cell may provide the indication of the candidate cell pool described in relation to 1202 (FIG. 12) and may include the features described. The serving cell may configure neighbor cells reference signals in CMR and IMR for L1-RSRP/L1-SINR report. In a first option, all the CMRs corresponding to different cells can be configured within a CMR set. For example, the CMRs corresponding to different cells can be configured with a CMR set in some embodiments. In a second option, CMRs corresponding to different cells are configured in different CMR sets.

In the first stage of the second option to maintain the same understanding between gNB and UEs that can support unsynchronized multi-TRP operation for some cells, gNB can configure a group of N candidate cells by RRC signaling. For example, the serving cell may configure the group of a number of candidate cells by RRC signaling. gNB may also provide some information for the candidate cells, e.g. physical cell ID, SSB location, transmission power and so on. For example, the serving cell may provide information for candidate cells, such as physical cell IDs, SSB locations, and/or transmission powers for the candidate cells. gNB can also provide TCI States with RS from candidate cells. For example, the serving cell may further provide TCI states with RSs from the candidate cells.

Further, in the first stage of the second option to maintain the same understanding between gNB and UEs that can support unsynchronized multi-TRP operation for some cells, gNB can configure UE to report whether it can support multi-TRPs based on current serving cell and one of the candidate cells by MAC CE. In one option, the MAC CE may include at least 1 candidate cell index from the N candidate cells as well as indication of synchronized/unsynchronized mode. In another option, the MAC CE may include N indicators, and each is used to indicate the first 2 or all the following 3 states: State 1: synchronized multi-TRP; State 2: unsynchronized multi-TRP; State 3: not recommended for multi-TRP operation.

The procedure 1300 may include identifying indication of cells and an indication of a multi-TRP operation mode in 1304. In particular, the serving cell may identify the information provided by the UE in the report in 1208 (FIG. 12). Based on the information, the serving cell may determine cells for multi-TRP operation of the UE and/or a multi-TRP operation mode for the UE.

The procedure 1300 may include enabling multi-TRP operation for the UE in 1306. In the first stage of the first option to maintain the same understanding between gNB and UEs that can support unsynchronized multi-TRP operation for some cells, gNB can enable the inter-cell multi-TRP operation by indicating transmission configuration indicator (TCI) corresponding to different cells, e.g. to include reference signal from neighbor cell as source reference signal in a TCI State. For example, the serving cell may enable the cells determined and/or the multi-TRP operation mode determined in 1304 for the UE. The serving cell may enable inter-cell multi-TRP operation for the UE by indicating TCIs corresponding to different cells. Reference signals from neighbor cells may be included in the indication as source reference signal in TCI states. If UE reports unsynchronized multi-TRP operation, gNB can configure different TAG index associated with the TCI State with neighbor cell RS, by RRC signaling or MAC CE. For example, if the serving cell determines the UE indicated unsynchronized multi-TRP operation, the serving cell may configure different TAG indexes associated with the TCI states with neighbor cell RSs by RRC signaling or MAC CE. In some embodiments, TAG index can be configured in a TCI state. In some embodiments, TAG index can be configured for a TCI state group, where one TCI state group includes TCIs from the same physical cell. If UE reports synchronized multi-TRP operation, gNB may not configure different TAG index associated with TCI State with RS from different cells.

In the third stage of the second option to maintain the same understanding between gNB and UEs that can support unsynchronized multi-TRP operation for some cells, gNB can enable the multi-TRP operation by RRC or MAC CE. For example, the serving cell may enable the inter-cell multi-TRP operation by RRC or MAC CE. The control signaling may include at least one of: physical cell ID for an assistant TRP for multi-TRP operation; TCI state for signals for the assistant TRP; TAG index for the assistant TRP. The control signaling may also include a state to disable multi-TRP operation of the UE.

FIG. 14 illustrates an example information element 1400 associated with the procedure 1200 of FIG. 12 and the procedure 1300 of FIG. 13 in accordance with some embodiments. In particular, the information element 1400 may include the indication of the candidate cell pool provided to the UE by the serving cell in 1202. The information element 1400 may comprise a CSI report configuration (CSI-ReportConfig) information element. The CSI-ReportConfig information element may include a physical cell ID list (physCellIdList) that may be the indication of the candidate cell pool.

FIG. 15 illustrates example information elements 1500 associated with the procedure 1200 of FIG. 12 and the procedure 1300 of FIG. 13 in accordance with some embodiments. The information elements 1500 may include a CSI report configuration (CSI-ReportConfig) information element 1502 and a CSI resource configuration (CSI-ResourceConfig) information element 1504. The information elements 1500 may be included in the report from the UE in 1208 (FIG. 12) in accordance with some embodiments. The CSI-ReportConfig information element 1502 may include a resources for channel measurement list (resourceForChannelMeasurementList) parameter, a CSI interference measurement (IM) resources for interference list (csi-IM-ResourcesForInterferenceList) parameter, and a CSI RS resources for interference list (nzp-CSI-RS-ResourcesForInterferenceList) in accordance with the report. The CSI-ResourceConfig information element may include a physical cell ID (physCellId) in accordance with the report.

FIG. 16 illustrates example information elements 1600 associated with the procedure 1200 of FIG. 12 and the procedure 1300 of FIG. 13 in accordance with some embodiments. The information elements 1600 may include a CSI report configuration (CSI-ReportConfig) information element 1602 and a CSI resource configuration (CSI-ResourceConfig) information element 1604. The information elements 1600 may be included in the report from the UE in 1208 (FIG. 12) in accordance with some embodiments. The CSI-ReportConfig information element 1602 may include one or more of the features of the CSI-ReportConfig information element 1502 (FIG. 15). The CSI-ResourceConfig information element may include a group based beam reporting type 2 (groupBasedBeamReportingType2) parameter in accordance with the report.

Figure 17:
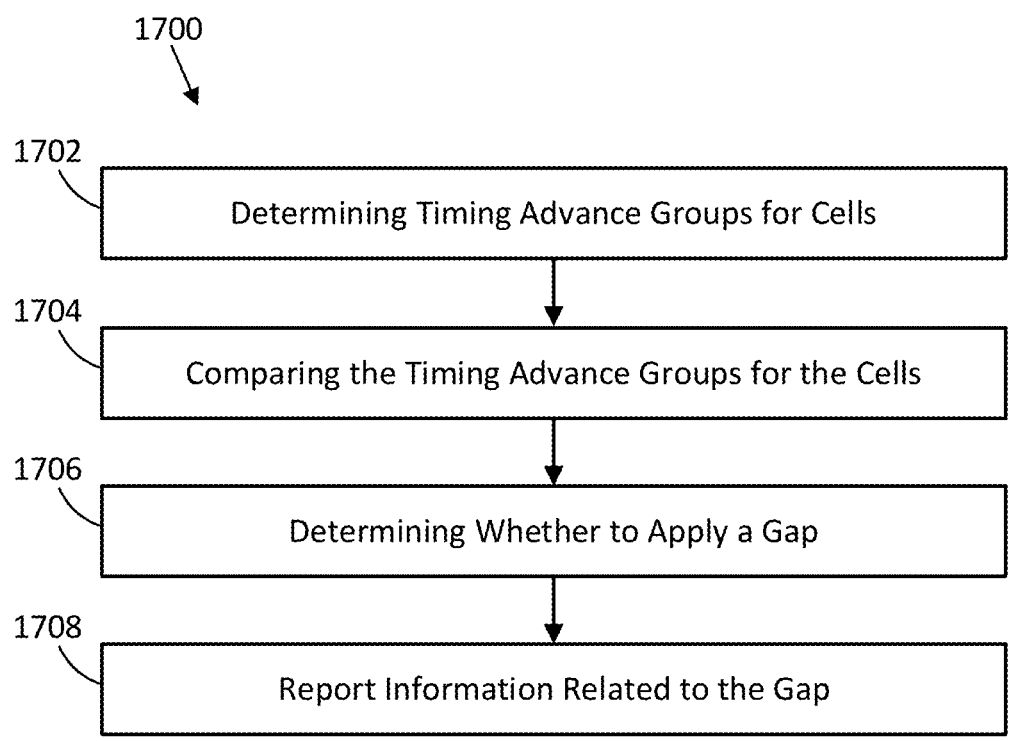
FIG. 17 illustrates an example procedure for avoiding overlap of signals in accordance with some embodiments.

FIG. 17 illustrates an example procedure 1700 for avoiding overlap of signals in accordance with some embodiments. The procedure 1700 may address the second issue of multiplexing of uplink signals with different TAGs. For example, the procedure 1700 may implement UE behavior/feedback for uplink signal transmission with multiple TAGs in a bandwidth part. Further, the procedure 1700 may have gNB scheduling restriction for uplink signals with different TAGS.

To avoid potential overlap of signals towards different TRPs with different TAGS, a gap may be introduced. For example, a gap may be introduced to avoid potential overlap of signals towards different cells with different TAGs. In one option, the value of the gap may be predefined, which may be defined per subcarrier spacing common for all subcarrier spacing, e.g. 1 symbol. In another option, the value of gap may be reported by UE. The value of the gap may be reported by UE capability in some embodiments. Alternatively, the value of gap may be reported in the second stage of the first option or the second option to maintain the same understanding between gNB and UEs that can support unsynchronized multi-TRP operation for some cells. For example, the value of the gap may be provided by the UE in the report in 1208 (FIG. 12). The UE may not need to transmit or receive signals during the gap.

The procedure 1700 may include determining TAGs for cells in 1702. In particular, the UE may identify cells being utilized by the UE for inter-cell multi-TRP and may determine TAGs for each, or a portion, of the cells. In some instances, determining the TAGs for cells may include identifying a first TAG corresponding to a first cell and a second TAG corresponding to a second cell.

The procedure 1700 may include comparing the TAGs for the cells in 1704. For example, the UE may compare TAGs for different cells to determine a difference between TAs for the cells. In some instances, the first TAG corresponding to the first cell may be compared with the second TAG corresponding to the second cell to determine a difference between a TA for the first cell and a TA for the second cell.

The procedure 1700 may include determining whether to apply a gap in 1706. In particular, the UE may determine whether to apply a gap based on the comparison between the TAGs for cells in 1704. Multiple options may be provided for the case when the gap is needed. In a first option, the gap may always be needed between signals with different TAGs in a bandwidth part. For example, the UE may determine that a gap is to be applied between signals toward different cells with different TAGs in a bandwidth part. In a second option, the gap may only be needed for one direction, e.g. signal from TAG_x to signal from TAG_y, but not needed for the other direction, e.g. signal from TAG_y to signal from TAG_x, where TAG_x is a TAG for a first cell and TAG_y is a TAG for a second cell. In some of the second option, TA in TAG_x is larger than TA in TAG_y. In some of the second option, UE may report which direction the gap is to be applied. The direction of the gap can be reported by feedback in the second stage of the first option or the second option to maintain the same understanding between gNB and UEs that can support unsynchronized multi-TRP operation for some cells. For example, the UE may determine whether a gap is to be applied depending on which direction a signal is to be directed. The UE may determine that a gap is to be applied with adjacent signals transitioning from being provided to a first cell to a second cell, and the UE may determine that a gap is not to be applied with adjacent signals transitioning from being provided to the second cell to the first cell. For example, the UE may determine a gap is to be applied for a signal from TAG_x to a signal from TAG_y, but a gap is not to be applied for a signal from TAG_x to a TAG_y, where TAG_x is a TAG for a first cell and TAG_y is a TAG for a second cell. In some embodiments, the UE may determine that the gap is to be applied in a direction that a TA of a cell to which the signaling is transitioning is larger than a TA of cell from which the signaling is transitioning. For example, the UE may determine a gap is to be applied for a TA in TAG_x is larger than a TA in TAG_y. In a third option The procedure 1700 may include reporting information related to the gap in 1708. In some embodiments, the UE may report which direction the gap is to be applied, the UE may report which direction the gap is to be applied, such as the second option where the gap may only be needed for one direction. The UE may report the direction the gap is to be applied to the serving cell. In some embodiments, the direction the gap is to be applied can be reported in the second stage of the first option or the second option to maintain the same understanding between gNB and UEs that can support unsynchronized multi-TRP operation for some cells. For example, the UE may report the direction in 1208. In some embodiments, whether the first option (where the gap may always be needed between signal with different TAGS in a bandwidth) or the second option (where the gap may only be needed for one direction, but not needed for the other direction) is to be applied can be reported by the UE. For example, an indication of which approach is utilized for determining whether to apply the gap in 1706. In some embodiments of this option, whether the first option or the second option is to be applied can be reported by UE capability. For example, the UE may report the indication by UE capability. In some embodiments of this option, whether the first option or the second option is to be applied can be reported by UE feedback in the second stage of the first option or the second option to maintain the same understanding between gNB and UEs that can support unsynchronized multi-TRP operation for some cells. For example, the UE may report the indication in 1208.

Figure 18:
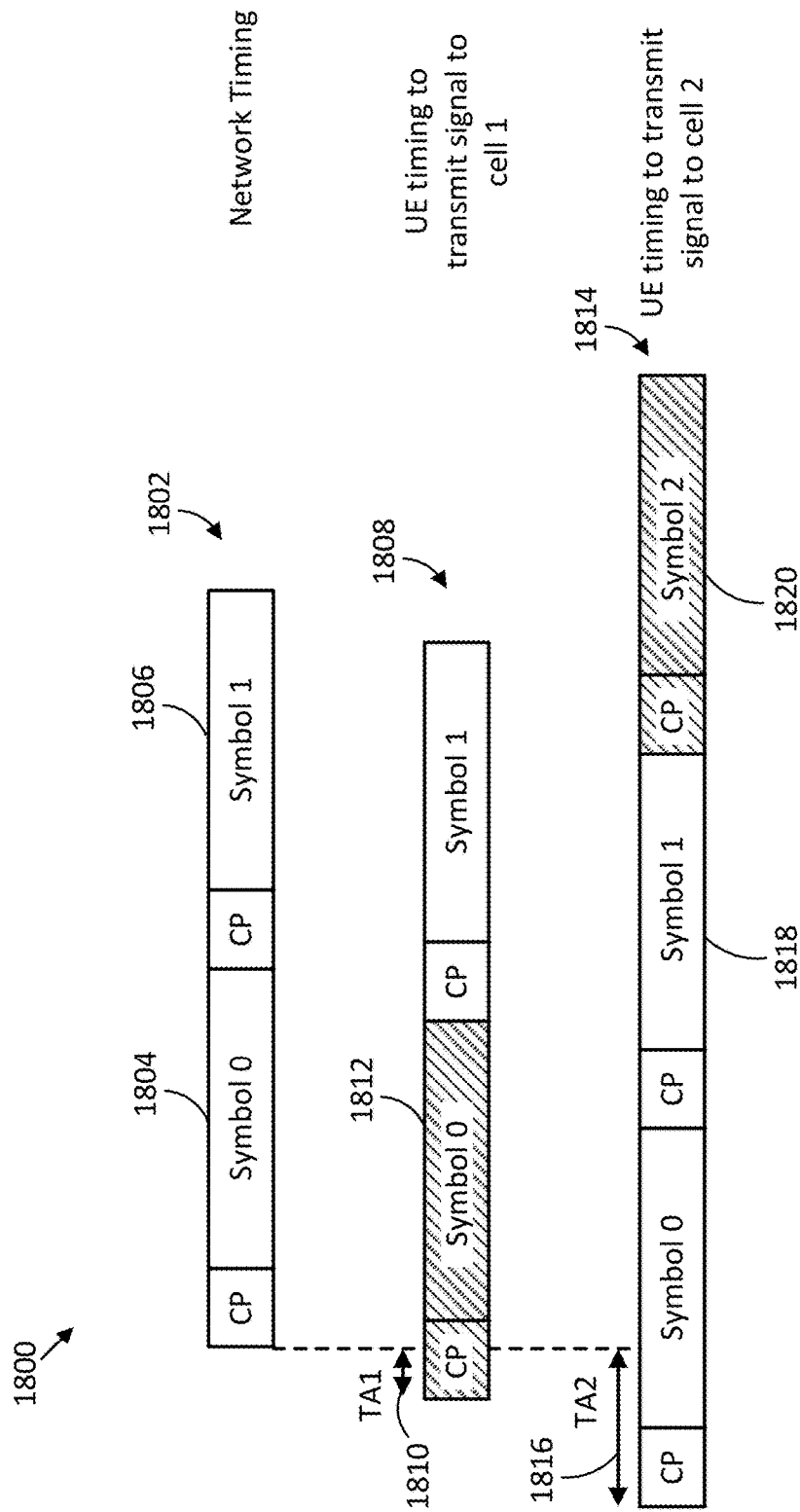
FIG. 18 illustrates an example timing graph associated with the procedure of FIG. 17 in accordance with some embodiments.

FIG. 18 illustrates an example timing graph 1800 associated with the procedure 1700 of FIG. 17 in accordance with some embodiments. In accordance with some embodiments, the timing graph 1800 may illustrate results for applying the gap based on direction in 1706 (FIG. 7).

The timing graph 1800 includes a network timing 1802. The network timing 1802 shows an example timing that a first symbol 1804 and a second symbol 1806 are to occur according to a timing of a network. For example, the network timing 1802 may illustrate a timing of a RAN in which a UE may establish inter-cell multi-TRP.

The timing graph 1800 may include a first cell transmit timing 1808. The first cell transmit timing 1808 may have a first TA 1810 compared to the network timing 1802. The first cell transmit timing 1808 may have a first signal scheduled to be transmitted on a first symbol 1812 of the first cell transmit timing 1808 (as illustrated by the lines in the first symbol 1812).

The timing graph 1800 may include a second cell transmit timing 1814. The second cell transmit timing 1814 may have a second TA 1816 compared to the network timing 1802. When scheduling a second signal toward the second cell subsequent to the first signal toward the first cell, the UE may compare the first TA 1810 and the second TA 1816 to determine whether to apply a gap. When UE switches from a signal with smaller TA to signals with larger TA, the gap may be applied. Based on the first TA 1810 being smaller than the second TA 1816 and the direction being from transitioning from the first signal being transmitted first toward the first cell to the second signal being transmitted toward the second cell, the UE may have determined that a gap was to be applied between the first signal and the second signal, where a second symbol 1818 may be the gap in the illustrated embodiment. Accordingly, the signal toward the second cell may be transmitted may be transmitted in a third symbol 1820 (as illustrated by the lines in the third symbol 1820) of the second cell transmit timing 1814 after the gap. Accordingly, overlap of the signals may be avoided.

Figure 19:
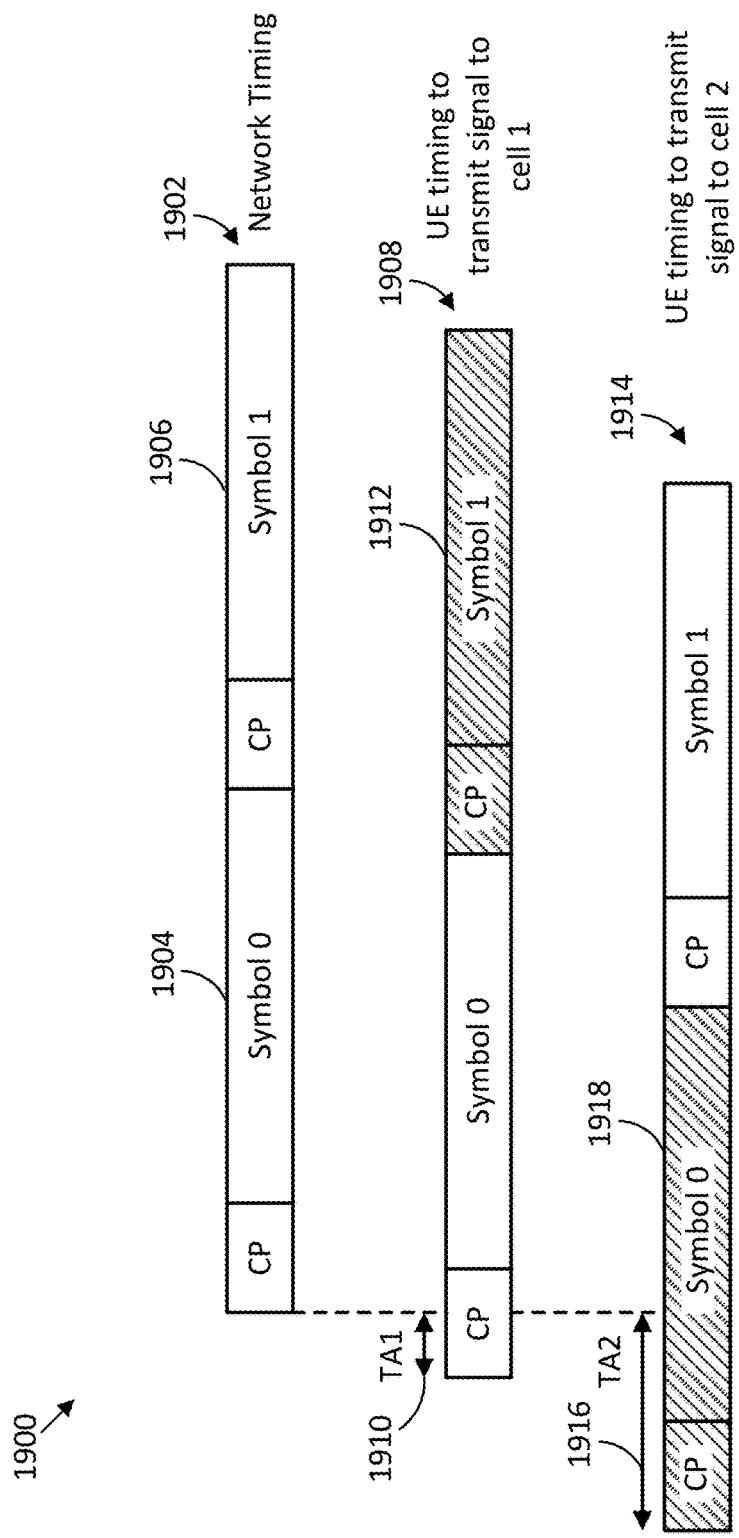
FIG. 19 illustrates an example timing graph associated with the procedure of FIG. 17 in accordance with some embodiments.

FIG. 19 illustrates an example timing graph 1900 associated with the procedure 1700 of FIG. 17 in accordance with some embodiments. In accordance with some embodiments, the timing graph 1900 may illustrate results for applying the gap based on direction in 1706 (FIG. 7).

The timing graph 1900 includes a network timing 1902. The network timing 1902 shows an example timing that a first symbol 1904 and a second symbol 1906 are to occur according to a timing of a network. For example, the network timing 1902 may illustrate a timing of a RAN in which a UE may establish inter-cell multi-TRP.

The timing graph 1900 may include a first cell transmit timing 1908. The first cell transmit timing 1908 may have a first TA 1910 compared to the network timing 1902. The first cell transmit timing 1908 may have a first signal scheduled to be transmitted on a second symbol 1912 of the first cell transmit timing 1908 (as illustrated by the lines in the second symbol 1912).

The timing graph 1900 may include a second cell transmit timing 1914. The second cell transmit timing 1914 may have a second TA 1916 compared to the network timing 1902. When scheduling a second signal toward the second cell subsequent to the first signal toward the first cell, the UE may compare the first TA 1910 and the second TA 1916 to determine whether to apply a gap. When UE switches from a signal with larger TA to signals with smaller TA, the gap may not be necessary. Based on the first TA 1910 being smaller than the second TA 1916 and the direction being from transitioning from the second signal being transmitted first toward the second cell to the first signal being transmitted toward the first cell, the UE may have determined that a gap was not to be applied between the first signal and the second signal. Accordingly, the signal toward the second cell may be transmitted in a first symbol 1918 (as illustrated by the lines in the first symbol 1918) of the second cell transmit timing 1914 without the gap, without the signals being overlapping.

Figure 20:
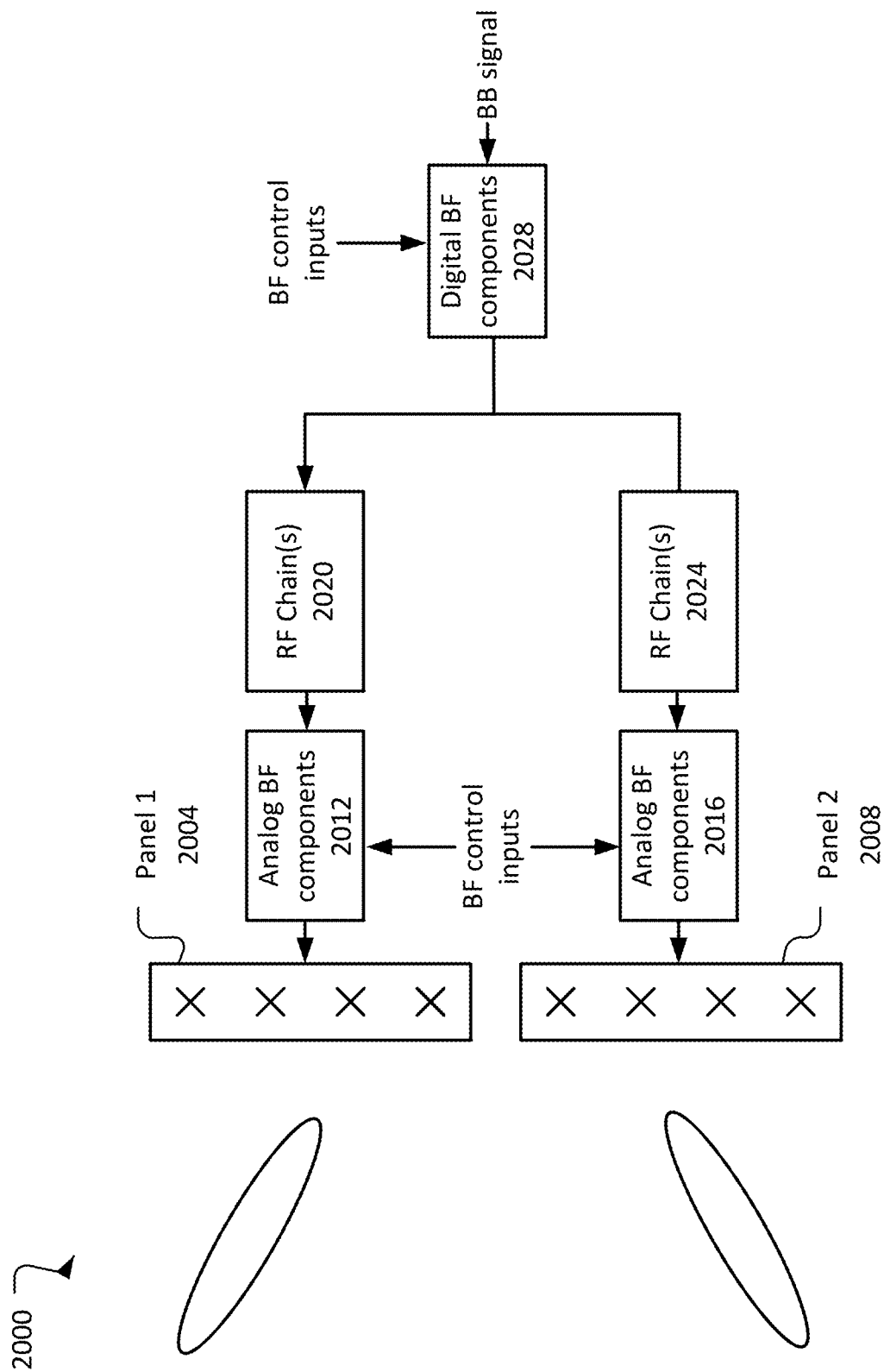
FIG. 20 illustrates example beamforming circuitry in accordance with some embodiments.

FIG. 20 illustrates example beamforming circuitry 2000 in accordance with some embodiments. The beamforming circuitry 2000 may include a first antenna panel, panel 1 2004, and a second antenna panel, panel 2 2008. Each antenna panel may include a number of antenna elements. Other embodiments may include other numbers of antenna panels.

Figure 21:
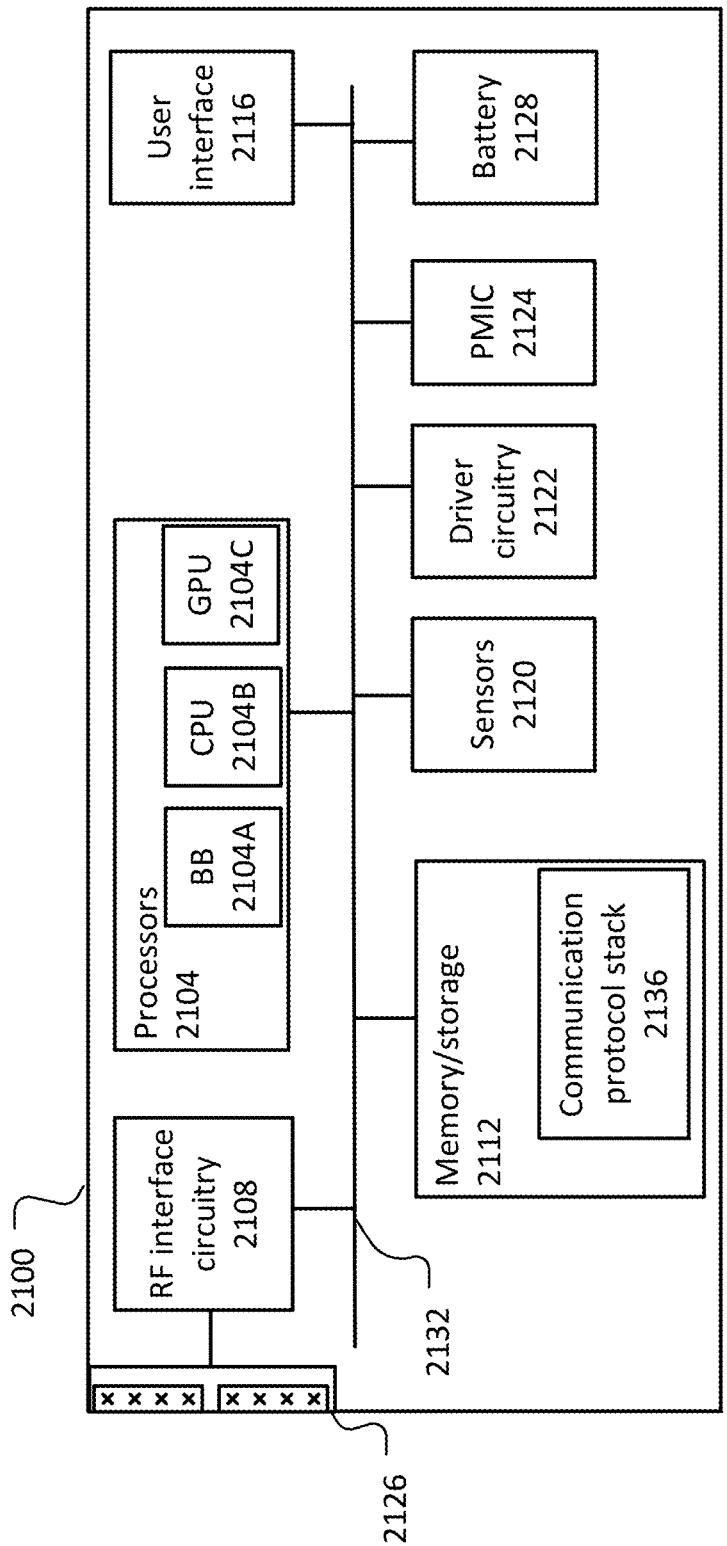
FIG. 21 illustrates an example user equipment in accordance with some embodiments.

Digital beamforming (BF) components 2028 may receive an input baseband (BB) signal from, for example, a baseband processor such as, for example, baseband processor 2104A of FIG. 21. The digital BF components 2028 may rely on complex weights to pre-code the BB signal and provide a beamformed BB signal to parallel radio frequency (RF) chains 2020/2024.

Each RF chain 2020/2024 may include a digital-to-analog converter to convert the BB signal into the analog domain; a mixer to mix the baseband signal to an RF signal; and a power amplifier to amplify the RF signal for transmission.

The RF signal may be provided to analog BF components 2012/2016, which may apply additionally beamforming by providing phase shifts in the analog domain. The RF signals may then be provided to antenna panels 2004/2008 for transmission.

In some embodiments, instead of the hybrid beamforming shown here, the beamforming may be done solely in the digital domain or solely in the analog domain.

In various embodiments, control circuitry, which may reside in a baseband processor, may provide BF weights to the analog/digital BF components to provide a transmit beam at respective antenna panels. These BF weights may be determined by the control circuitry to provide the directional provisioning of the serving cells as described herein. In some embodiments, the BF components and antenna panels may operate together to provide a dynamic phased-array that is capable of directing the beams in the desired direction.

FIG. 21 illustrates an example UE 2100 in accordance with some embodiments. The UE 2100 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices. In some embodiments, the UE 2100 may be a RedCap UE or NR-Light UE.

The UE 2100 may include processors 2104, RF interface circuitry 2108, memory/storage 2112, user interface 2116, sensors 2120, driver circuitry 2122, power management integrated circuit (PMIC) 2124, antenna structure 2126, and battery 2128. The components of the UE 2100 may be implemented as integrated circuits (ICs), portions thereof, discrete electronic devices, or other modules, logic, hardware, software, firmware, or a combination thereof. The block diagram of FIG. 21 is intended to show a high-level view of some of the components of the UE 2100. However, some of the components shown may be omitted, additional components may be present, and different arrangement of the components shown may occur in other implementations.

The components of the UE 2100 may be coupled with various other components over one or more interconnects 2132, which may represent any type of interface, input/ output, bus (local, system, or expansion), transmission line, trace, optical connection, etc. that allows various circuit components (on common or different chips or chipsets) to interact with one another.

The processors 2104 may include processor circuitry such as, for example, baseband processor circuitry (BB) 2104A, central processor unit circuitry (CPU) 2104B, and graphics processor unit circuitry (GPU) 2104C. The processors 2104 may include any type of circuitry or processor circuitry that executes or otherwise operates computer-executable instructions, such as program code, software modules, or functional processes from memory/storage 2112 to cause the UE 2100 to perform operations as described herein.

In some embodiments, the baseband processor circuitry 2104A may access a communication protocol stack 2136 in the memory/storage 2112 to communicate over a 3GPP compatible network. In general, the baseband processor circuitry 2104A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 2108.

The baseband processor circuitry 2104A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 2112 may include one or more non-transitory, computer-readable media that includes instructions (for example, communication protocol stack 2136) that may be executed by one or more of the processors 2104 to cause the UE 2100 to perform various operations described herein. The memory/storage 2112 include any type of volatile or non-volatile memory that may be distributed throughout the UE 2100. In some embodiments, some of the memory/storage 2112 may be located on the processors 2104 themselves (for example, L1 and L2 cache), while other memory/storage 2112 is external to the processors 2104 but accessible thereto via a memory interface. The memory/storage 2112 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 2108 may include transceiver circuitry and radio frequency front module (RFEM) that allows the UE 2100 to communicate with other devices over a radio access network. The RF interface circuitry 2108 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 2126 and proceed to filter and amplify (with a low-noise amplifier) the signal. The signal may be provided to a receiver of the transceiver that down-converts the RF signal into a baseband signal that is provided to the baseband processor of the processors 2104.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 2126.

In various embodiments, the RF interface circuitry 2108 may be configured to transmit/receive signals in a manner compatible with NR access technologies.

The antenna 2126 may include antenna elements to convert electrical signals into radio waves to travel through the air and to convert received radio waves into electrical signals. The antenna elements may be arranged into one or more antenna panels. The antenna 2126 may have antenna panels that are omnidirectional, directional, or a combination thereof to enable beamforming and multiple input, multiple output communications. The antenna 2126 may include microstrip antennas, printed antennas fabricated on the surface of one or more printed circuit boards, patch antennas, phased array antennas, etc. The antenna 2126 may have one or more panels designed for specific frequency bands including bands in FR1 or FR2.

In some embodiments, the UE 2100 may include the beamforming circuitry 2000 (FIG. 20), where the beamforming circuitry 2000 may be utilized for communication with the UE 2100. In some embodiments, components of the UE 2100 and the beamforming circuitry may be shared. For example, the antennas 2126 of the UE may include the panel 1 2004 and the panel 2 2008 of the beamforming circuitry 2000.

The user interface circuitry 2116 includes various input/ output (I/O) devices designed to enable user interaction with the UE 2100. The user interface 2116 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 2100.

The sensors 2120 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 2122 may include software and hardware elements that operate to control particular devices that are embedded in the UE 2100, attached to the UE 2100, or otherwise communicatively coupled with the UE 2100. The driver circuitry 2122 may include individual drivers allowing other components to interact with or control various input/output (I/O) devices that may be present within, or connected to, the UE 2100. For example, driver circuitry 2122 may include a display driver to control and allow access to a display device, a touchscreen driver to control and allow access to a touchscreen interface, sensor drivers to obtain sensor readings of sensor circuitry 2120 and control and allow access to sensor circuitry 2120, drivers to obtain actuator positions of electro-mechanic components or control and allow access to the electro-mechanic components, a camera driver to control and allow access to an embedded image capture device, audio drivers to control and allow access to one or more audio devices.

The PMIC 2124 may manage power provided to various components of the UE 2100. In particular, with respect to the processors 2104, the PMIC 2124 may control power-source selection, voltage scaling, battery charging, or DC-to-DC conversion.

In some embodiments, the PMIC 2124 may control, or otherwise be part of, various power saving mechanisms of the UE 2100. For example, if the platform UE is in an RRC_Connected state, where it is still connected to the RAN node as it expects to receive traffic shortly, then it may enter a state known as Discontinuous Reception Mode (DRX) after a period of inactivity. During this state, the UE 2100 may power down for brief intervals of time and thus save power. If there is no data traffic activity for an extended period of time, then the UE 2100 may transition off to an RRC_Idle state, where it disconnects from the network and does not perform operations such as channel quality feedback, handover, etc. The UE 2100 goes into a very low power state and it performs paging where again it periodically wakes up to listen to the network and then powers down again. The UE 2100 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 2128 may power the UE 2100, although in some examples the UE 2100 may be mounted deployed in a fixed location, and may have a power supply coupled to an electrical grid. The battery 2128 may be a lithium ion battery, a metal-air battery, such as a zinc-air battery, an aluminum-air battery, a lithium-air battery, and the like. In some implementations, such as in vehicle-based applications, the battery 2128 may be a typical lead-acid automotive battery.

Figure 22:
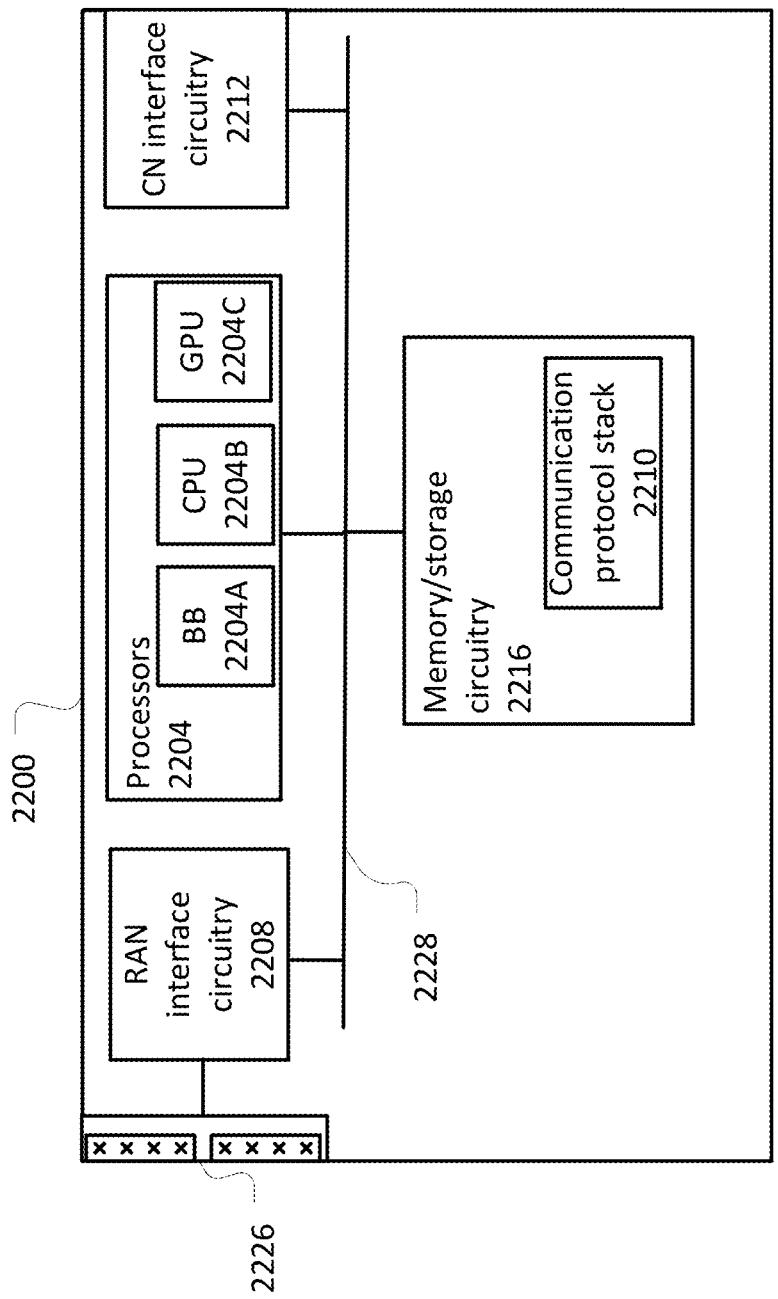
FIG. 22 illustrates an example next generation node B in accordance with some embodiments.

FIG. 22 illustrates an example gNB 2200 in accordance with some embodiments. The gNB 2200 may include processors 2204, RF interface circuitry 2208, core network (CN) interface circuitry 2212, memory/storage circuitry 2216, and antenna structure 2226.

The components of the gNB 2200 may be coupled with various other components over one or more interconnects 2228.

The processors 2204, RF interface circuitry 2208, memory/storage circuitry 2216 (including communication protocol stack 2210), antenna structure 2226, and interconnects 2228 may be similar to like-named elements shown and described with respect to FIG. 21.

The CN interface circuitry 2212 may provide connectivity to a core network, for example, a 5th Generation Core network (5GC) using a 5GC-compatible network interface protocol such as carrier Ethernet protocols, or some other suitable protocol. Network connectivity may be provided to/from the gNB 2200 via a fiber optic or wireless backhaul. The CN interface circuitry 2212 may include one or more dedicated processors or FPGAs to communicate using one or more of the aforementioned protocols. In some implementations, the CN interface circuitry 2212 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 may include one or more computer-readable media having instructions that, when executed by one or more processors, cause a user equipment (UE) to identify a control resource set pool index (CORESETPoolIndex) or a physical cell identifier (ID) within control signaling for the UE, and determine a cell of a plurality of cells configured for multi-TRP operation with the UE based on the CORESETPoolIndex or the physical cell ID for signal transmission.

Example 2 may include the one or more computer-readable media of example 1, wherein the CORESETPoolIndex or the physical cell ID is associated with transmission configuration indication (TCI) or spatial relation indication for the signal transmission.

Example 3 may include the one or more computer-readable media of example 1, wherein the CORESETPoolIndex or physical cell ID is explicitly configured for the signal transmission by a radio resource control (RRC) control element or a medium access control (MAC) control element.

Example 4 may include the one or more computer-readable media of example 3, wherein the physical cell ID is configured per sounding reference signal resource or resource set, physical uplink control channel resource group, or control resource set (CORESET).

Example 5 may include the one or more computer-readable media of example 4, wherein the cell is determined for physical downlink shared channel (PDSCH)/physical uplink shared channel (PUSCH) based on a scheduling physical downlink control channel (PDCCH) or an indicated/configured sounding reference signal (SRS) resource indicator (SRI).

Example 6 may include the one or more computer-readable media of example 1, wherein the cell is for downlink signal transmission, and wherein the instructions, when executed by the one or more processors, further cause the UE to identify a scrambling ID within the control signaling for the UE, and determine a cell for uplink signal transmission based on the scrambling ID.

Example 7 may include the one or more computer-readable media of example 6, wherein the scrambling ID is configured for the uplink signal transmission by radio resource control (RRC) signaling.

Example 8 may include the one or more computer-readable media of example 6, wherein the cell for uplink signal transmission is an assistant cell separate from a serving cell, and wherein the instructions, when executed by the one or more processors, further cause the UE to identify a data scrambling identity physical uplink shared channel for the cell (dataScramblingIdentityPUSCH2) and a hopping ID (hoppingId2) to be utilized for signals associated with the cell for uplink signal transmission.

Example 9 may include the one or more computer-readable media of example 6, wherein the cell for uplink signal transmission is an assistant cell separate from a serving cell, and wherein the instructions, when executed by the one or more processors, further cause the UE to produce a pathloss reference signal list for the cell for uplink signal transmission.

Example 10 may include the one or more computer-readable media of example 1, wherein the cell is for downlink signal transmission, and wherein the instructions, when executed by the one or more processors, further cause the UE to identify a synchronization signal/physical broadcast channel (SSB) within the control signaling for the UE, and identify a cell for a physical random access channel (PRACH) based on the SSB.

Example 11 may include the one or more computer-readable media of example 1, wherein the cell is a scheduled cell, wherein the control signaling is received from a scheduling cell, and wherein the instructions, when executed by the one or more processors, further cause the UE to identify an indication from the scheduling cell of cross-cell scheduling for transmission of a signal to the scheduled cell, and determine an offset for the scheduled cell.

Example 12 may include the one or more computer-readable media of example 11, wherein to determine the offset includes to determine a predefined value as the offset.

Example 13 may include the one or more computer-readable media of example 11, wherein the instructions, when executed by the one or more processors, further cause the UE to report the offset includes to report the offset by UE capability.

Example 14 may include the one or more computer-readable media of example 11, wherein to determine the offset includes to determine the offset by a timing advance (TA) for the scheduling cell and a TA for the scheduled cell.

Example 15 may include the one or more computer-readable media of example 14, wherein to determine the offset includes to determine the offset to be a first value if the TA for the scheduled cell is greater than the TA for the scheduling cell, or determine the offset to be a second value if the TA for the scheduled cell is less than the TA for the scheduling cell, wherein the second value is greater than the first value.

Example 16 may include the one or more computer-readable media of example 11, wherein to determine the offset includes to determine whether a difference between an amount of delay between the scheduling cell and the scheduled cell is greater than a cyclic prefix (CP), and determine the offset to be zero if the difference is less than the CP or non-zero if the difference is greater than the CP.

Example 17 may include the one or more computer-readable media of example 16, wherein the instructions, when executed by the one or more processors, further cause the UE to report at least one delay indicator (DI) to the scheduling cell to indicate whether the difference is greater than the CP.

Example 18 may include the one or more computer-readable media of example 17, wherein to report the at least one DI includes to report the at least one DI in a layer 1 reference signal received power (L1-RSRP)/layer 1 signal to noise and interference ratio (L1-SINR) report.

Example 19 may include the one or more computer-readable media of example 18, wherein the at least one DI includes a synchronization signal/physical broadcast channel (SSB) index reference signal received power (RSRP) DI (ssb-Index-RSRP-DI), a channel state information reference signal (CSI-RS) resource indicator (CRI) index RSRP DI (cri-RSRP-DI), an SSB index signal to noise and interference ration (SINR) DI (ssb-Index-SINR-DI), and a CRI index SINR DI (cri-SINR-DI).

Example 20 may include the one or more computer-readable media of example 18, wherein to report the at least one DI includes to report the at least one DI in a medium access control (MAC) control element (CE).

Example 21 may include the one or more computer-readable media of example 1, wherein the cell is a neighbor cell, wherein the control signaling is received from a serving cell, and wherein the instructions, when executed by the one or more processors, further cause the UE to determine a slot boundary for a slot of the neighbor cell for a UE capability.

Example 22 may include the one or more computer-readable media of example 21, wherein to determine the slot boundary for the slot of the neighbor cell includes to determine a multiplier of a slot duration from a time domain boundary for the serving cell.

Example 23 may include the one or more computer-readable media of example 22, wherein the multiplier is predefined.

Example 24 may include the one or more computer-readable media of example 22, wherein the instructions, when executed by the one or more processors, further cause the UE to report the multiplier by the UE capability.

Example 25 may include the one or more computer-readable media of example 22, wherein to determine the multiplier includes to determine the multiplier based on a timing advance (TA) for the serving cell and a TA for the neighbor cell.

Example 26 may include the one or more computer-readable media of example 21, wherein to determine the slot boundary includes to count a maximum number of beam management reference signals in the slot based on a number of reference signals corresponding to the neighbor cell in the slot.

Example 27 may include the one or more computer-readable media of example 21, wherein to determine the slot boundary includes to count a number of UE capabilities for the neighbor cell.

Example 28 may include one or more computer-readable media having instructions that, when executed by one or more processors, cause a user equipment (UE) to identify an indication of a candidate cell pool for multi-transmission reception point (TRP) operation from a serving cell, determine one or more cells from the candidate cell pool for multi-TRP operation for the UE, determine a multi-TRP operation mode for the one or more cells, and report an indication of the one or more cells and an indication of the multi-TRP operation mode in a report to the serving cell.

Example 29 may include the one or more computer-readable media of example 28, wherein the candidate cell pool includes channel measurement resources (CMRs) corresponding to different cells within a CMR set, wherein the CMRs include reference signals for neighbor cells.

Example 30 may include the one or more computer-readable media of example 28, wherein the candidate cell pool includes channel measurement resources (CMRs) corresponding to different cells in different CMR sets, wherein the CMRs include reference signals for neighbor cells.

Example 31 may include the one or more computer-readable media of example 28, wherein the report is a type 2 group based beam report.

Example 32 may include the one or more computer-readable media of example 28, wherein the report includes a synchronization signal/physical broadcast channel (SSB) resource indicator (SSBRI)/channel state information reference signal (CSI-RS) resource indicator (CRI) corresponding to the serving cell, a layer 1 reference signal received power (L1-RSRP)/layer 1 signal to noise and interference ratio (L1-SINR) corresponding to the serving cell, a SSBRI/CRI corresponding to a neighbor cell, and a SSBRI/CRI corresponding to the neighbor cell.

Example 33 may include the one or more computer-readable media of example 28, wherein the instructions, when executed by the one or more processors, further cause the UE to identify an indication of a transmission configuration indicator (TCI) corresponding to the one or more cells to enable inter-cell multi-TRP operation for the UE.

Example 34 may include the one or more computer-readable media of example 33, wherein the indication of the TCI includes a timing advance group (TAG) index.

Example 35 may include the one or more computer-readable media of example 34, wherein the indication of the TCI is provided by radio resource control (RRC) signaling or medium access control (MAC) control element (CE).

Example 36 may include the one or more computer-readable media of example 28, wherein the candidate cell pool the indication of the candidate cell pool includes physical cell identifiers (IDs), synchronization signal/physical broadcast channel (SSB) locations, and transmission powers for candidate cells within the candidate cell pool.

Example 37 may include the one or more computer-readable media of example 36, wherein the indication of the candidate cell pool further includes transmission configuration indication (TCI) states with reference signals from the candidate cells.

Example 38 may include the one or more computer-readable media of example 28, wherein the instructions, when executed by the one or more processors, further cause the UE to determine whether the UE can support multi-TRPs based on the serving cell and a candidate cell of the candidate cell pool.

Example 39 may include the one or more computer-readable media of example 38, wherein the report is reported by medium access control (MAC) control element (CE).

Example 40 may include the one or more computer-readable media of example 39, wherein the MAC CE includes a candidate cell index from the candidate cell.

Example 41 may include the one or more computer-readable media of example 28, wherein the indication of the multi-TRP operation mode includes an indicator that indicates a synchronized multi-TRP, unsynchronized multi-TRP, or not recommended for multi-TRP operation.

Example 42 may include the one or more computer-readable media of example 28, wherein the instructions, when executed by the one or more processors, further cause the UE to identify a physical cell identifier (ID) for an assistant TRP for multi-TRP operation, a transmission configuration indication (TCI) state for the assistant TRP, and a timing advance group for the assistant TRP provided by radio resource control (RRC) or medium access control (MAC) control element (CE).

Example 43 may include the one or more computer-readable media of example 42, wherein the instructions, when executed by the one or more processors, further cause the UE to identify a state to disable multi-TRP operation provided by the RRC or the MAC CE.

Example 44 may include one or more computer-readable media having instructions that, when executed by one or more processors, cause a user equipment (UE) to determine a timing advance group (TAG) for a first cell, determine a TAG for a second cell, compare the TAG for the first cell with the TAG for the second cell, and determine whether to apply a gap for a first signal to be transmitted to the first cell and a second signal to be transmitted to the second cell based on the comparison of the TAG for the first cell with the TAG for the second cell.

Example 45 may include the one or more computer-readable media of example 44, wherein to determine whether to apply the gap includes to determine to apply the gap based on the TAG for the first cell and the TAG for the second cell being different, and wherein the instructions, when executed by the one or more processors, further cause the UE to determine a minimal value of the gap to be a predefined value.

Example 46 may include the one or more computer-readable media of example 45, wherein the predefined value is defined per subcarrier spacing or common for all subcarrier spacing.

Example 47 may include the one or more computer-readable media of example 44, wherein to determine whether to apply the gap includes to determine to apply the gap based on the TAG for the first cell and the TAG for the second cell being different, and wherein the instructions, when executed by the one or more processors, further cause the UE to report a minimal value of the gap by UE capability to the first cell.

Example 48 may include the one or more computer-readable media of example 44, wherein to determine whether to apply the gap includes to identify a first signal in a bandwidth part to be provided to the first cell and a second signal in the bandwidth part to be provided to the second cell, the second signal being adjacent to the first signal, and determine to apply the gap between the first signal and the second signal based on the TAG for the first cell and the TAG for the second cell being different.

Example 49 may include the one or more computer-readable media of example 44, wherein to determine whether to apply the gap includes to identify a first signal in a bandwidth part to be provided to the first cell and a second signal in the bandwidth part to be provided to the second cell, the second signal to be provided to the second cell subsequent to the first signal being provided to the first cell, and determine to apply the gap between the first signal and the second signal based on the TAG for the second cell being larger than the TAG for the first cell.

Example 50 may include the one or more computer-readable media of example 44, wherein to determine whether to apply the gap includes to determine which of the TAG of the first cell and the TAG for the second cell is larger to determine a direction to which the gap is to be applied, and wherein the instructions, when executed by the one or more processors, further cause the UE to report an indication of the direction to the first cell.

Example 51 may include one or more computer-readable media having instructions that, when executed by one or more processors, cause a user equipment (UE) to receive first control signaling to schedule a downlink transmission by a first downlink signal, the first control signaling to include first beam indication signaling or first explicit association configuration information, receive second control signaling to schedule the downlink transmission by a second downlink signal, the second control signaling to include second beam indication signaling or explicit association configuration information, determine, based on the first control signaling, the first downlink signal is configured with a first CORESET pool index or first physical cell identifier (ID) and is to be transmitted by a first cell, determine, based on the second control signaling, the second downlink signal is configured with a second CORESET pool index or second physical cell ID and is to be transmitted by a second cell, and process the first and second downlink signals based on determination that the first downlink signal and the second downlink signal are to be transmitted by respective first and second cells to receive the downlink transmission.

Example 52 may include the one or more computer-readable media of example 51, wherein the first CORESET pool index or the first physical cell ID is associated with a first transmission configuration indication (TCI) or first spatial relation indication for the first downlink signal, and wherein the second CORESET pool index or the second physical cell ID is associated with a second TCI or second spatial relation indication for the second downlink signal.

Example 53 may include the one or more computer-readable media of example 51, wherein the first CORESET pool index or the first physical cell ID is explicitly configured for the first downlink signal by a radio resource control (RRC) control element or a medium access control (MAC) control element (CE), and wherein the second CORESET pool index or the second physical cell ID is explicitly configured for the second downlink signal by the RRC or the MAC CE.

Example 54 may include the one or more computer-readable media of example 51, wherein the instructions, when executed by the one or more processors, further cause the UE to identify a scrambling ID within the first control signaling, and determine a cell for uplink signal transmission based on the scrambling ID.

Example 55 may include the one or more computer-readable media of example 51, wherein the first cell is a scheduling cell, wherein the second cell is a scheduled cell, wherein the control signaling is received from the scheduling cell, and wherein the instructions, when executed by the one or more processors, further cause the UE to identify an indication from the scheduling cell of cross-cell scheduling for transmission of a signal to the scheduled cell, and determine an offset for the scheduled cell.

Example 56 may include the one or more computer-readable media of example 55, wherein to determine the offset includes to determine the offset by a timing advance (TA) for the scheduling cell and a TA for the scheduled cell.

Example 57 may include the one or more computer-readable media of example 55, wherein to determine the offset includes to determine whether a difference between an amount of delay between the scheduling cell and the scheduled cell is greater than a cyclic prefix (CP), and determine the offset to be zero if the difference is less than the CP or non-zero if the difference is greater than the CP.

Example 58 may include the one or more computer-readable media of example 51, wherein the first cell is a serving cell, wherein the second cell is a neighbor cell, wherein the control signaling is received from the serving cell, and wherein the instructions, when executed by the one or more processors, further cause the UE to determine a slot boundary for a slot of the neighbor cell for a UE capability.

Example 59 may include the one or more computer-readable media of example 58, wherein to determine the slot boundary for the slot of the neighbor cell includes to determine a multiplier of a slot duration from a time domain boundary for the serving cell.

Example 60 may include the one or more computer-readable media of example 51, wherein the first downlink signal is configured with the first CORESET pool index and the first physical cell ID, and wherein the second downlink signal is configured with a second CORESET pool index and the second physical cell ID.

Example 61 may include the one or more computer-readable media of example 51, wherein the first physical cell ID is same as the second physical cell ID, and wherein the first CORESET pool index is same as the second CORESET pool index based on the first physical cell ID being same as the second physical cell ID.

Example 62 may include a user equipment comprising a plurality of panels to receive and transmit signals with cells, and processing circuitry coupled to the plurality of panels, the processing circuitry to perform the operations of any of examples 1-61.

Example 63 may include one or more computer-readable media having instructions that, when executed by one or more processors, cause a base station to provide a candidate cell pool for multi-transmission reception point (TRP) operation to a user equipment (UE), identification an indication of one or more cells within the candidate cell pool and an indication of a multi-TRP operation mode for the UE received from the UE, and enable the multi-TRP operation mode with the one or more cells for the UE.

Example 64 may include the one or more computer-readable media of example 63, wherein the instructions, when executed by the one or more processors, further cause the base station to configure neighbor cell reference signals in channel measurement resource (CMR) and interference measurement resource (IMR) for layer 1 reference signal received power (L1-RSRP)/layer 1 signal to noise and interference ratio (L1-SINR) report.

Example 65 may include the one or more computer-readable media of example 63, wherein to enable the multi-TRP operation mode includes to indicate a transmission configuration indicator (TCI) for cells within the candidate cell pool to the UE.

Example 66 may include the one or more computer-readable media of example 65, wherein to indicate the TCI includes to include reference signals from neighbor cells of the cells within the candidate cell pool as source reference signals in TCI states.

Example 67 may include the one or more computer-readable media of example 66, wherein the indication of the multi-TRP operation mode indicates an unsynchronized multi-TRP operation mode, and wherein the instructions, when executed by the one or more processors, further cause the base station to configure different TAG indexes associated with the TCI states by radio resource control (RRC) or medium access control (MAC) control element (CE).

Example 68 may include the one or more computer-readable media of example 63, wherein the instructions, when executed by the one or more processors, further cause the base station to provides physical cell identifiers (IDs), synchronization signal/physical broadcast channel (SSB) locations, and transmission powers for candidate cells within the candidate cell pool to UE.

Example 69 may include the one or more computer-readable media of example 63, wherein the instructions, when executed by the one or more processors, further cause the base station to provide a physical cell identifier (ID) for an assistant TRP for multi-TRP operation, a transmission configuration indicator (TCI) for signals for the assistant TRP, or a timing advance group (TAG) index for the assistant TRP.

Example 70 may include a base station comprising logic, modules, circuitry, or antennas to perform one or more of the operations of any of examples 63-69

Example 71 may include a user equipment (UE) comprising a plurality of panels to receive and transmit signals with cells, and processing circuitry coupled to the plurality of panels, the processing circuitry to identify an indication of a candidate cell pool for multi-transmission reception point (TRP) operation from a serving cell, determine one or more cells from the candidate cell pool for multi-TRP operation for the UE, determine a multi-TRP operation mode for the one or more cells, and report an indication of the one or more cells and an indication of the multi-TRP operation mode in a report to the serving cell.

Example 72 may include the UE of example 71, wherein the candidate cell pool includes channel measurement resources (CMRs) corresponding to different cells within a CMR set, wherein the CMRs include reference signals for neighbor cells.

Example 73 may include the UE of example 71, wherein the candidate cell pool includes channel measurement resources (CMRs) corresponding to different cells in different CMR sets, wherein the CMRs include reference signals for neighbor cells.

Example 74 may include the UE of example 71, wherein the report includes a synchronization signal/physical broadcast channel (SSB) resource indicator (SSBRI)/channel state information reference signal (CSI-RS) resource indicator (CRI) corresponding to the serving cell, a layer 1 reference signal received power (L1-RSRP)/layer 1 signal to noise and interference ratio (L1-SINR) corresponding to the serving cell, a SSBRI/CRI corresponding to a neighbor cell, and a SSBRI/CRI corresponding to the neighbor cell.

Example 75 may include the UE of example 71, wherein the processing circuitry is further to identify an indication of a transmission configuration indicator (TCI) corresponding to the one or more cells to enable inter-cell multi-TRP operation for the UE.

Example 76 may include the UE of example 71, wherein the candidate cell pool the indication of the candidate cell pool includes physical cell identifiers (IDs), synchronization signal/physical broadcast channel (SSB) locations, and transmission powers for candidate cells within the candidate cell pool.

Example 77 may include the UE of example 71, wherein the processing circuitry is further to cause the UE to determine whether the UE can support multi-TRPs based on the serving cell and a candidate cell of the candidate cell pool.

Example 78 may include a method of operating user equipment (UE) comprising determining a timing advance group (TAG) for a first cell, determining a TAG for a second cell, comparing the TAG for the first cell with the TAG for the second cell, and determining whether to apply a gap for a first signal to be transmitted to the first cell and a second signal to be transmitted to the second cell based on the comparison of the TAG for the first cell with the TAG for the second cell.

Example 79 may include the method of example 78, wherein determining whether to apply the gap includes determining to apply the gap based on the TAG for the first cell and the TAG for the second cell being different, and wherein the method further comprises causing the UE to determine a minimal value of the gap to be a predefined value.

Example 80 may include the method of example 78, wherein determining whether to apply the gap includes to determine to apply the gap based on the TAG for the first cell and the TAG for the second cell being different, and wherein the method further comprises causing the UE to report a minimal value of the gap by UE capability to the first cell.

Example 81 may include the method of example 78, wherein determining whether to apply the gap includes to identifying a first signal in a bandwidth part to be provided to the first cell and a second signal in the bandwidth part to be provided to the second cell, the second signal being adjacent to the first signal, and determining to apply the gap between the first signal and the second signal based on the TAG for the first cell and the TAG for the second cell being different.

Example 82 may include the method of example 78, wherein determining whether to apply the gap includes determining which of the TAG of the first cell and the TAG for the second cell is larger to determine a direction to which the gap is to be applied, and wherein the method further comprises causing the UE to report an indication of the direction to the first cell.

Example 83 may include a method comprising performance of the operations of any of examples 1-82.

Example 84 may include an apparatus comprising means to perform one or more elements of any of examples 1-82.

Example 85 may include a signal as described in or related to any of examples 1-82, or portions or parts thereof.

Example 86 may include a datagram, information element, packet, frame, segment, PDU, or message as described in or related to any of examples 1-82, or portions or parts thereof, or otherwise described in the present disclosure.

Example 87 may include a signal encoded with data as described in or related to any of examples 1-82, or portions or parts thereof, or otherwise described in the present disclosure.

Example 88 may include a signal encoded with a datagram, IE, packet, frame, segment, PDU, or message as described in or related to any of examples 1-82, or portions or parts thereof, or otherwise described in the present disclosure.

Example 89 may include an electromagnetic signal carrying computer-readable instructions, wherein execution of the computer-readable instructions by one or more processors is to cause the one or more processors to perform the method, techniques, or process as described in or related to any of examples 1-82, or portions thereof.

Example 90 may include a signal in a wireless network as shown and described herein.

Example 91 may include a method of communicating in a wireless network as shown and described herein.

Example 92 may include a system for providing wireless communication as shown and described herein.

Example 93 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
   processing circuitry to:
     determine one or more cells for multi-transmission reception point (TRP) operation for a user equipment (UE); and
     identify a configuration of a transmission configuration indicator (TCI) state, the configuration to include a timing advance group (TAG) index to indicate a TAG of a serving cell of the one or more cells where the TCI state is to be applied; and
   interface circuitry coupled with the processing circuitry, the interface circuitry to communicatively couple the processing circuitry with a component of a device.

2. The apparatus of claim 1, wherein the processing circuitry is further to identify an indication of a candidate cell pool that includes channel measurement resources (CMRs) corresponding to different cells within a CMR set, wherein the CMRs include reference signals for neighbor cells, and wherein the one or more cells are determined from the candidate cell pool.

3. The apparatus of claim 1, wherein the processing circuitry is further to identify an indication of a candidate cell pool that includes channel measurement resources (CMRs) corresponding to different cells in different CMR sets, wherein the CMRs include reference signals for neighbor cells, and wherein the one or more cells are determined from the candidate cell pool.

4. The apparatus of claim 1, wherein the processing circuitry is further to generate a report that indicates the one or more cells and a multi-TRP operation mode for the one or more cells for transmission, and wherein the report includes a synchronization signal/physical broadcast channel (SSB) resource indicator (SSBRI)/channel state information reference signal (CSI-RS) resource indicator (CRI) corresponding to the serving cell, a layer 1 reference signal received power (L1-RSRP)/layer 1 signal to noise and interference ratio (L1-SINR) corresponding to the serving cell, a SSBRI/CRI corresponding to a neighbor cell, and a SSBRI/CRI corresponding to the neighbor cell.

5. The apparatus of claim 1, wherein the TCI state is to enable inter-cell multi-TRP operation for the UE.

6. The apparatus of claim 1, wherein the processing circuitry is further to identify an indication of a candidate cell pool that includes physical cell identifiers (IDs), synchronization signal/physical broadcast channel (SSB) locations, and transmission powers for candidate cells within the candidate cell pool, wherein the one or more cells are determined from the candidate cell pool.

7. The apparatus of claim 1, wherein the processing circuitry is further to:
   identify an indication of a candidate cell pool, wherein the one or more cells are determined from the candidate cell pool; and
   determine whether multi-TRPs can be supported based on the serving cell and a candidate cell of the candidate cell pool.

8. One or more non-transitory computer-readable media having instructions that, when executed, cause processing circuitry to:
   determine a configuration of a transmission configuration indicator (TCI) state for multi-transmission reception point (TRP) operation for a user equipment (UE), the configuration to include a timing advance group (TAG) index to indicate a TAG of a serving cells of one or more cells where the TCI state is to be applied; and
   generate an indication of the configuration for transmission.

9. The one or more non-transitory computer-readable media of claim 8, wherein the instructions, when executed, further cause the processing circuitry to:
   configure neighbor cell reference signals in channel measurement resource (CMR) and interference measurement resource (IMR) for layer 1 reference signal received power (L1-RSRP)/layer 1 signal to noise and interference ratio (L1-SINR) report.

10. The one or more non-transitory computer-readable media of claim 8, wherein the instructions, when executed, further cause the processing circuitry to:
    provide a candidate cell pool for multi-TRP operation to the UE; and
    enable a multi-TRP operation mode with the one or more cells, wherein to enable the multi-TRP operation mode includes to indicate a transmission configuration indicator (TCI) for cells within the candidate cell pool to the UE.

11. The one or more non-transitory computer-readable media of claim 8, wherein the instructions, when executed, further cause the processing circuitry to:
    provide a candidate cell pool for multi-TRP operation to the UE; and
    provide physical cell identifiers (IDs), synchronization signal/physical broadcast channel (SSB) locations, and transmission powers for candidate cells within the candidate cell pool to the UE.

12. A method comprising:
    determining one or more cells for multi-transmission reception point (TRP) operation for a user equipment (UE); and
    identifying a configuration of a transmission configuration indicator (TCI) state, the configuration to include a timing advance group (TAG) index to indicate a TAG of a serving cell of the one or more cells where the TCI state is to be applied.

13. The method of claim 12, further comprising determining a multi-TRP operation mode for the one or more cells, wherein the multi-TRP operation mode includes an unsynchronized multi-TRP operation mode, a synchronized multi-TRP operation mode, or a multi-TRP unsupported operation mode.

14. The method of claim 12, further comprising generating a report that indicates the one or more cells and a multi-TRP operation mode for the one or more cells, wherein the report is to be transmitted via a medium access control (MAC) control element (CE).

15. The method of claim 12, further comprising determining whether multi-TRP operation is supported for the one or more cells based on a serving cell and the one or more cells, indication of synchronized/unsynchronized mode for the one or more cells, or indication of states for the one or more cells.

16. The method of claim 15, wherein the states include a synchronized multi-TRP state, an unsynchronized multi-TRP state, or a not recommended for multi-TRP operation state.

17. The method of claim 12, further comprising determining the one or more cells from a candidate cell pool, wherein the candidate cell pool includes channel measurement resources (CMRs) corresponding to different cells within a CMR set, wherein the CMRs include reference signals for neighbor cells.

18. The method of claim 12, further comprising determining the one or more cells from a candidate cell pool, wherein the candidate cell pool includes channel measurement resources (CMRs) corresponding to different cells in different CMR sets, wherein the CMRs include reference signals for neighbor cells.

19. The method of claim 12, further comprising generating a report that indicates the one or more cells and a multi-TRP operation mode, wherein the report includes a synchronization signal/physical broadcast channel (SSB) resource indicator (SSBRI)/channel state information reference signal (CSI-RS) resource indicator (CRI) corresponding to a serving cell, a layer 1 reference signal received power (L1-RSRP)/layer 1 signal to noise and interference ratio (L1-SINR) corresponding to the serving cell, a SSBRI/CRI corresponding to a neighbor cell, and a SSBRI/CRI corresponding to the neighbor cell.

20. The method of claim 12, further comprising:
identifying an indication of a TCI corresponding to the one or more cells to enable inter-cell multi-TRP operation for the UE.

* * * * *